(12) United States Patent
Mehrotra et al.

(10) Patent No.: US 9,608,936 B1
(45) Date of Patent: Mar. 28, 2017

(54) NETWORK SYSTEM WITH OFFLOAD SERVICES FOR FLASH STORAGE

(71) Applicant: Sanmina Corporation, San Jose, CA (US)

(72) Inventors: Sharad Mehrotra, Saratoga, CA (US); Thomas Gourley, Banks, OR (US); Abbas Morshed, Los Altos, CA (US); Julian Ratcliffe, Portland, OR (US); Jon Livesey, Sunnyvale, CA (US)

(73) Assignee: Sanmina Corporation, San Jose, CA (US)

( * ) Notice: Subject to any disclaimer, the term of this patent is extended or adjusted under 35 U.S.C. 154(b) by 35 days.

(21) Appl. No.: 14/552,393

(22) Filed: Nov. 24, 2014

Related U.S. Application Data

(63) Continuation of application No. 14/324,028, filed on Jul. 3, 2014, now abandoned.

(51) Int. Cl.
*H04L 12/00* (2006.01)
*H04L 12/947* (2013.01)

(52) U.S. Cl.
CPC .................................. *H04L 49/25* (2013.01)

(58) Field of Classification Search
CPC .............................. H04L 49/25; H04L 12/00
See application file for complete search history.

(56) References Cited

U.S. PATENT DOCUMENTS

| | | | |
|---|---|---|---|
| 5,615,329 A | 3/1997 | Kern et al. | |
| 6,061,750 A | 5/2000 | Beardsley et al. | |
| 6,173,367 B1 | 1/2001 | Aleksic et al. | |
| 6,205,507 B1 | 3/2001 | Elkhoury et al. | |
| 6,460,122 B1 | 10/2002 | Otterness et al. | |
| 6,820,171 B1 | 11/2004 | Weber et al. | |
| 6,928,514 B2 | 8/2005 | Chatterjee et al. | |
| 6,983,396 B2 | 1/2006 | Brant et al. | |
| 7,836,204 B2 | 11/2010 | Kalos et al. | |
| 8,117,376 B2 | 2/2012 | Hemmi | |
| 2003/0016703 A1* | 1/2003 | Oldenborgh | H04L 25/14 370/535 |
| 2004/0193800 A1 | 9/2004 | Krehbiel, Jr. et al. | |
| 2005/0240809 A1 | 10/2005 | Ash et al. | |
| 2006/0031639 A1 | 2/2006 | Benhase | |
| 2007/0248017 A1* | 10/2007 | Hinata | G06F 3/061 370/238 |

(Continued)

OTHER PUBLICATIONS

U.S. Appl. No. 14/453,105, filed Aug. 6, 2014, Cache Memory Management System and Method.

(Continued)

*Primary Examiner* — Brian D Nguyen
(74) *Attorney, Agent, or Firm* — Schwegman Lundberg & Woessner, P.A.

(57) ABSTRACT

A system is provided comprising: a packet routing network; Flash storage circuitry; a management processor coupled as an endpoint to the network; an input/output (I/O) circuit coupled as an endpoint to the network; a packet processing circuit coupled as an endpoint to the network; and a RAID management circuit coupled as an endpoint to the network and configured to send and receive packets to and from the Flash storage circuitry; wherein the management processor is configured to determine routing of packets among the I/O circuit, packet processing circuit and RAID management circuit.

10 Claims, 19 Drawing Sheets

(56) References Cited

U.S. PATENT DOCUMENTS

| | | | | |
|---|---|---|---|---|
| 2008/0016269 | A1* | 1/2008 | Chow | G06F 13/1684 711/103 |
| 2008/0189723 | A1* | 8/2008 | Elliott | G06F 3/061 719/326 |
| 2010/0080117 | A1 | 4/2010 | Coronado et al. | |
| 2011/0138160 | A1* | 6/2011 | Sato | G06F 12/109 713/2 |
| 2011/0191535 | A1 | 8/2011 | Yuasa | |
| 2011/0238938 | A1 | 9/2011 | Kloeppner et al. | |
| 2012/0023282 | A1 | 1/2012 | Rub | |
| 2012/0137289 | A1* | 5/2012 | Nolterieke | G06F 9/45558 718/1 |
| 2013/0042066 | A1 | 2/2013 | Price | |
| 2013/0311706 | A1 | 11/2013 | Okada et al. | |
| 2014/0040677 | A1 | 2/2014 | Matsui | |
| 2014/0215030 | A1* | 7/2014 | Terwilliger | H04L 41/0856 709/220 |
| 2014/0215458 | A1* | 7/2014 | Devarapalli | G06F 9/455 718/1 |
| 2014/0244876 | A1 | 8/2014 | Colpo et al. | |
| 2014/0281140 | A1 | 9/2014 | Mehrotra et al. | |
| 2014/0281153 | A1 | 9/2014 | Mehrotra et al. | |
| 2014/0281169 | A1 | 9/2014 | Mehrotra et al. | |
| 2016/0117281 | A1 | 4/2016 | Akaike et al. | |

OTHER PUBLICATIONS

U.S. Appl. No. 14/552,329, filed Nov. 24, 2014, Cache Memory Management System and Method.
U.S. Appl. No. 14/324,028, filed Jul. 3, 2014, Network System With Offload Services for Flash Storage.
U.S. Appl. No. 14/324,031, filed Jul. 3, 2014, Network System With Cache Offload Service for Flash Storage.
U.S. Appl. No. 14/552,400, filed Nov. 24, 2014, Network System With Cache Offload Service for Flash Storage.
"U.S. Appl. No. 13/844,663, Non Final Office Action mailed Dec. 24, 2014", 8 pgs.
"ExpressFabric(r) PCI Express as a Converged, Rack-Level Interconnect", PLX Technology, (May 2013), 1-16.
"HP Moonshot System", Family Data Sheet (c) 2013 Hewlett-Packard Development Company, (Apr. 2013), 8 pgs.
"HP Moonshot System—Technical White Paper", (c) 2013 Hewlett-Packard Development Company, (2013), 1-8.
"HP Moonshot: An Accelerator for Hyperscale Workloads", (c) 2013 Moor Insights & Strategy, (2013), 9 pgs.
"Juniper Networks QFabric: Scaling for the Modern Data Center", (c) 2011 ACG Research, (2011), 1-9.
"Non-Transparent Bridging Simplied—Multi-Host System and Intelligent I/O Design with PCI Express", (c) 2004 PLX Technology, Inc., (2004), 4 pgs.
"Product Overview—Brief Overview of the Product Families & Applications", PLX Technology, (May 2013), 1-46.
"QFabric tm System", (c) 2013 Juniper Networks, Inc., (Jun. 2013), 12 pgs.
"Technology Brief PCI Express", PLX Technology, (2003), 5 pgs.
"The data center of tomorrow: How disruptive will new technologies be?", (c) 2013 Goldman Sachs, (Apr. 10, 2013), 1-34.
"White Paper: Egenera Cloud Suite", (c) 2013 Egenera Inc., (2013), 8 pgs.
Blake, Bob, "Choosing the Right Programmable Logic Solution for PCI Express Applications", [online]. Retrieved from the Internet: <URL: http://www.rtcmagazine.com/articles/view/100327>, (Apr. 2005), 1-7.
Budruk, Ravi, "PCI Express(r) Basics", (c) 2007, PCI-SIG, (2007), 40 pgs.
Hutchinson, Lee, "The SSD Revolution / An ARS Technica Feature", Solid-state revolution: in-depth on how SSDs really work, (Jun. 4, 2012), 1-27.
Morgan, Timothy P., "'Til heftier engines come aboard, HP Moonshot only about clouds", [online]. [retrieved on Apr. 9, 2013]. Retrieved from the Internet: <URL: http://www.theregister.co.uk/2013/04/09/hp_moonshot_server_analysis/>, (Apr. 9, 2013), 1-8.
Myslewski, Rik, "HP wants to help you mount a Moonshot", [onlline]. [retrieved on Nov. 3, 2013]. Retrieved from the Internet: <URL: http://www.theregister.co.uk/2013/11/02/hp_pathfinder_innovation_ecosystem_and_discovery_lab/>, (2013), 3 pgs.
Regula, Jack, "Using Non-transpatent Bridging in PCI Express Systems", PLX Technology, Inc., (Jun. 1, 2004), 1-31.
Vahdat, Amin, "The Emerging Optical Data Center", OSA/OFC/NFOEC 2011, (2011), 3 pgs.
"U.S. Appl. No. 14/552,329, Non Final Office Action mailed Jul. 20, 2016", 19 pgs.

\* cited by examiner

700

702 — Tracking Metrics
704 — Cache Tags
706 — Cache Lines

| Tracking Metrics | Cache Tags | Cache Lines |
|---|---|---|
| ... | $T_A$ | $D_A$ |
|  | $T_B$ | $D_B$ |
|  | $T_C$ | $D_C$ |
|  | ⋮ | ⋮ |

*FIG. 5A*

NETWORK SYSTEM WITH OFFLOAD SERVICES FOR FLASH STORAGE

CLAIM OF PRIORITY

This Application is a Continuation Application of U.S. application Ser. No. 14/324,028, filed Jul. 3, 2014, the contents of which are hereby incorporated by reference in its entirety and the benefit of priority is claimed herein.

BACKGROUND

The large amounts of information generated daily challenge data handling facilities as never before. In the context of today's information generation, data is being generated at rates perhaps thousands or tens of thousands of times greater than was the data-generation rate in the 1990s. Historically, large volumes of data sparked explosive growth in data communications. Responses to growing amounts of data generation centered on improving the movement of data based in increased transmission data rates to enhance throughput in communication channels. For instance, transmission pipelines grew from a few tens of megabits-per-second (Mb/s) transmission rates to several tens of gigabits-per-second (Gb/s) rates during the 1990s.

In the same period, typical storage devices, such as hard disk drives (HDDs), when amassed in sufficient numbers, might accommodate large volumes of data, but the rates at which data could be stored and retrieved have not scaled at the same rate as the volume of data stored on the devices has increased. Data access rates for HDDs are at similar orders of magnitude today as they were in the '90s.

Fundamental storage subsystems have not integrated technology to enable scaling of effective data storage at the same rate that data generation is growing. Hence the challenge to systems handling large volumes of data is not likely to be alleviated by the combination of contemporary HDD technology with high-speed data transmission channels. In order to handle and manage big data, information processing facilities will be pressured to utilize larger volumes of storage with higher performance rates for capturing and accessing data.

BRIEF DESCRIPTION OF THE DRAWINGS

Some embodiments are illustrated by way of example and not limitation in the figures of the accompanying drawings in which:

FIG. 5A illustrates an example cache table maintained in each of the tags and matching logic modules connected to respective FPGAs according to some embodiments.

DESCRIPTION OF EMBODIMENTS

Introduction

Figure 1:
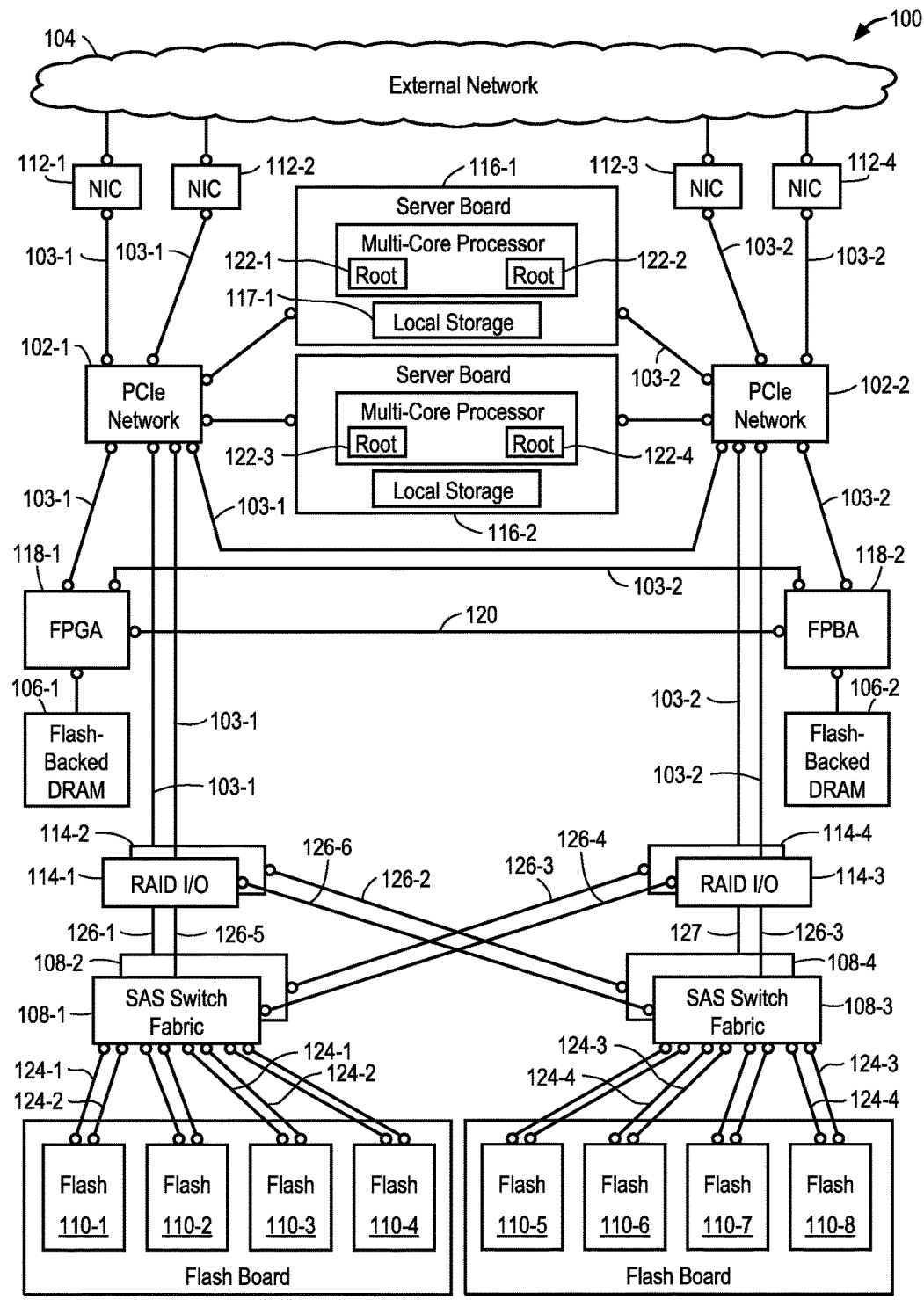
FIG. 1 is an illustrative schematic block diagram of a network storage system 100 in accordance with some embodiments.

The following description is presented to enable any person skilled in the art to create and use a computer system that provides high speed access to data storage devices, particularly Flash storage devices. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform some of these processes. The flow diagrams that represent computer-implemented processes include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

System Overview

FIG. 1 is an illustrative schematic block diagram of a network storage system 100 in accordance with some embodiments. The system includes redundant components that permit recovery from component failures, for example. More specifically, the system 100 includes redundant first and second packet routing networks (hereinafter, the "routing networks" or "networks") 102-1, 102-2 that route packets between endpoints. First and second general purpose management processors 116-1, 116-2 are coupled as endpoints to each of the networks 102-1, 102-2. The first and second general purpose management processors 116-1, 116-2 are associated with respective first and second non-transitory local memory devices (hereinafter "local memory devices" or "local memory") 117-1, 117-2. A plurality of Flash solid state (storage) drive (SSD) circuits (hereinafter "Flash circuits" or "Flash") 110-1 to 110-8 are coupled as endpoints to each of the routing networks 102-1, 102-2. Input/Output (I/O) circuits 112-1 to 112-4 are coupled as endpoints to each of the routing networks 102-1, 102-2 and act as communication interfaces between the routing networks 102-1, 102-2 and an external network 104. Storage access networks 108-1 to 108-4 provide access to the Flash circuits 110-1 to 110-8. Storage I/O interface circuits 114-1 to 114-4 are coupled as endpoints to each of the routing networks 102-1, 102-2 and act as communication interfaces between the routing networks 102-1, 102-2 and storage access networks 108-1 to 108-4. First and second packet processing circuits 118-1, 118-2 are coupled as endpoints to each of the network 102-1, 102-2. The first and second packet processing circuits are configured to impart one or more services to packets transported over the networks 102-1, 102-2. In some embodiments, the service imparted by the first and second packet processing circuits includes a cache service, and the first and second packet processing circuits 118-1, 118-2 are coupled to cache storage circuitry 106-1, 106-2, which in some embodiments includes Flash backed DRAM circuits. In some embodiments, the service imparted by the first and second packet processing circuits includes one or more of encryption/decryption, duplication/de-duplication, compression/de-compression, replication, snapshot, for example.

In accordance with some embodiments, the network "fabric" of the first and second packet routing networks 102-1, 102-2 is compliant with the PCI Express Base Specification (hereinafter "PCIe") released by the PCISIG (PCI Special Interest Group). See, PCI Express Technology, Comprehensive Guide to Generations 1.x, 2.x and 3.0, by M. Jackson and R. Budruk, 2102, Mindshare, Inc. PCIe specifies point-to-point bidirectional serial communication paths between endpoints over switches and connection lines. Information is transmitted in packets between endpoints over the routing networks 102-1, 102-2. A PCIe network includes serial connection lines commonly referred to as 'links' that are capable of sending and receiving information at the same time. More specifically, information transmitted through either one or the other of the routing networks 102-1, 102-2 is encapsulated in packets that include routing information that indicates a source endpoint and a destination endpoint. According to the PCIe specification in accordance with some embodiments, a link can include one or more serial transmit and serial receive connection pairs. Each individual pair is referred to as a 'lane'. A link can be made up of multiple lanes. Each lane uses differential signaling, sending both positive and negative versions of the same signal. Advantages of differential signaling include improved noise immunity and reduced signal voltage. Each endpoint device coupled to one or both of the routing networks 102-1, 102-2 includes "core" logic that implements one or more functions. A device that is a component of a typical PCIe compliant network, can have multiple functions, up to eight in some embodiments, each implementing its own configuration space.

Figure 2:
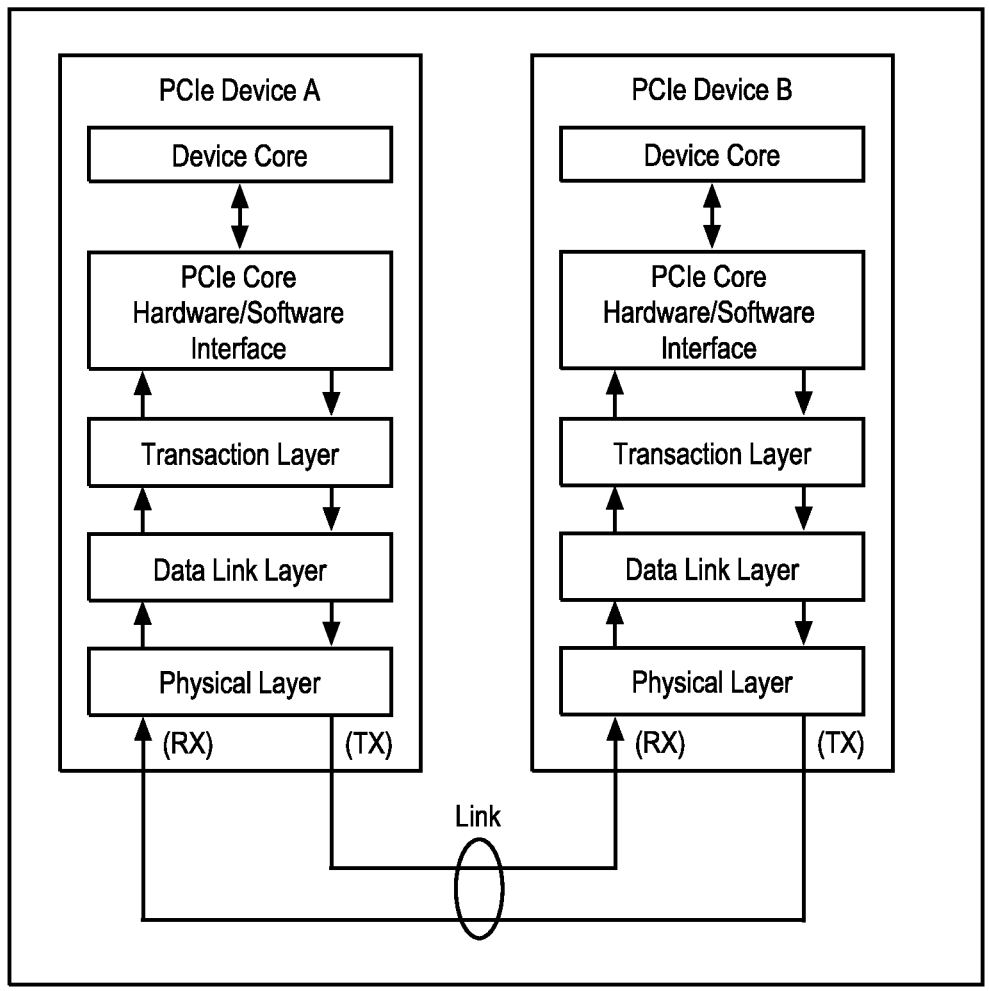
FIG. 2 is a generalized illustrative block level drawing representing an architecture of each of the routing networks of the system of FIG. 1, having example endpoint devices coupled to it in accordance with some embodiments.

FIG. 2 is a generalized illustrative block level drawing representing an architecture of each of the routing networks 102-1, 102-2 of system 100 of FIG. 1, having example endpoint device A and endpoint device B coupled to it, in accordance with some embodiments. The drawing of FIG. 2 is disclosed in, PCI Technology, Supra. Device A and device B represent endpoints that have different core functionalities, for example. The illustrated Link comprises a circuit path through packet routing network, 102-1, or 102-2 between endpoint device A and endpoint device B. A transaction layer is responsible for transaction layer packet (TLP) creation on the transmit side and transaction layer decoding on the receive side. The transaction layer is responsible for quality of service functionality, flow control functionality and transaction ordering functionality. A data link layer is responsible for data link layer packet (DLLP) creation and decoding. In some embodiments, the data link layer is responsible for link error detection and correction and implements a function that is referred to as an Ack/Nak protocol. A sending transmitter device holds a transmitted packet in a replay buffer until it receives an Ack signal from the receiver device confirming receipt, whereupon the sender flushes the packet from its replay buffer. In response to the sender receiving a Nak signal from the receiver, indicating an error, the sender resends the packet. On the transmit side, a physical layer is responsible for ordered-set packet creation and to provide serial output differentially clocked information onto the communication lanes. On the receive side, physical layer processing includes serially receiving the differentially encoded bits and converting to a digital format.

Referring again to FIG. 1, the first management processor 116-1 is used to configure the first packet routing network circuit 102-1 to provide point-to-point communication between components operably coupled to it. The second management processor 116-2 is used to configure the second packet routing network circuit 102-2 to provide point-to-point communication between components operably coupled to it. In some embodiments, the first and second management processors 116-1, 116-2 configure point-to-point routing within the first and second packet routing networks. In other words, for a given pair of resource circuits, a fixed route among switches in the internal network circuits 102-1 or 102-2 is configured to transmit packets between the pair.

The PCIe specification specifies use of a root complex to configure a PCIe compliant network. A root complex includes interface circuitry (e.g., processor interface, DRAM interface) that couples a management processor and the rest of a PCIe network. Management processor 116-1 includes first and second root complexes 122-1, 122-2 that act as interfaces between processor 102-2 and network circuits 102-1 and 102-2. Management processor 116-2 includes second and third root complexes 122-3, 122-4 that act as interfaces between processor 102-2 and network circuits 102-1 and 102-2. The term "root" is used to indicate that the root complex is disposed at a root of an inverted tree topology that is characteristic of a hierarchical PCIe compliant network.

Figure 3:
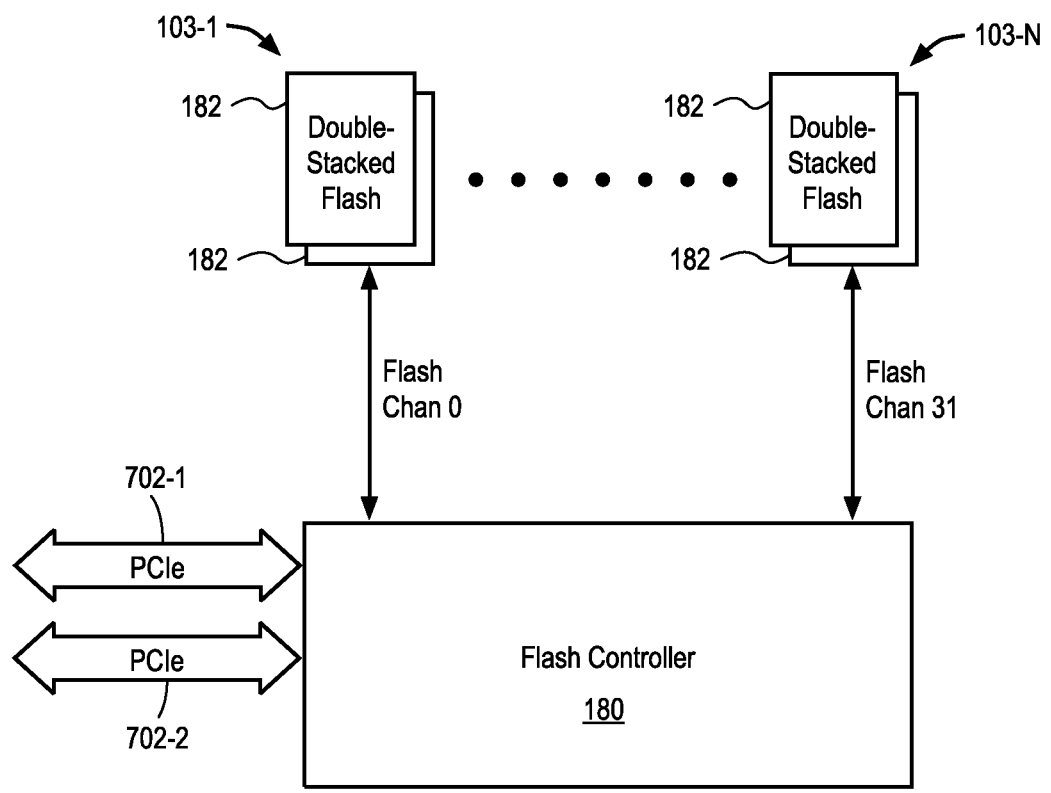
FIG. 3 is an illustrative schematic diagram showing a plurality of Flash storage modules coupled to a Flash memory controller, which in turn, is coupled to the first and second packet routing networks in accordance with some embodiments.

FIG. 3 is an illustrative schematic diagram showing a plurality of Flash storage modules 103-1 to 103-N coupled to a Flash memory controller 180, which in turn, is coupled to the first and second packet networks 102-1, 102-2. It will be appreciated that for simplification of explanation, FIG. 1 shows the system 100 with only a few representative Flash circuits 110-1 to 110-8. However, in some embodiments, a system 100 can include a large number "N" of Flash endpoints, such as two-hundred of them, for example. Moreover, as shown in FIG. 3, in some embodiments each endpoints 110-1 to 110-N can include a double stacked Flash storage module that includes multiple individual Flash integrated circuits (ICs) 182 arranged on opposite surfaces of a printed circuit board (PCB) (not shown). In accordance with some embodiments, the Flash circuit modules 110-1 to 110-N share the same form factor, and in some embodiments, the Flash circuit modules' from factor is compliant with a dual inline memory module (DIMM) format. A memory controller 180 is coupled to the routing networks 102-1, 102-2 and manages the flow of data going to and from the Flash ICs on the Flash storage module of the endpoints.

Referring again to FIG. 1, The I/O interface circuits 112-1 to 112-4 provide high-speed connections between the external network 104 (e.g., InfiniBand, Fibre Channel, and/or Ethernet) and the first switch network circuitry 102-1, 102-2. The I/O circuitry provides protocol conversion, including packet format conversion, during high-speed data communication between the external network 104 and the first switch network circuitry 102-1, 102-2. In some embodiments, the external network I/O interface circuits 112-1 to 112-4 are implemented as network interface cards commonly referred to as NICs, which include circuits that are configured to transform packets to suitable formats as they pass between the external network 104 and the routing networks 102-1, 102-2.

The storage I/O interface circuits 114-1 to 114-4 manage the distribution of data across the Flash storage circuits 110-1 to 110-8. In some embodiments, the storage I/O interface circuits are configured to implement a file system used to control how data is stored in and retrieved from storage devices. In some embodiments, the storage I/O interface circuits 114-1 to 114-4 are implemented as RAID controllers configured to organize data across multiple storage devices, such as Flash storage devices 110-1 to 110-8. The term RAID refers to data storage schemes that combine multiple disk drive components into a logical unit for the purposes of data redundancy and performance improvement. Persons skilled in the art will appreciate that Flash storage, sometimes referred to as solid-state drive (SSD) is a data storage device using integrated circuit assemblies as memory to store data persistently. Each of the storage access switch networks 108-1 to 108-4 provides point-to-point connections 124-1 to 124-4, respectively, using a serial protocol that moves data to and from the Flash storage devices 110-1 to 110-8. In some embodiments, the storage access switch networks 108-1 to 108-4 use a protocol that includes the SAS (Serial Attached SCSI) protocol. In general, according to the SAS protocol, there are three types of SAS devices: initiators (e.g., RAID controllers), target storage devices (e.g., Flash circuits), and expanders. An initiator device attaches to one or more target storage devices, to create a SAS domain. In some embodiments, the storage I/O interface circuits, implemented as RAID controllers, act as SAS initiators. In accordance with some embodiments, the Flash storage circuits 110-1 to 110-8 act as SAS targets. Using expanders (e.g., low-cost, high-speed switches), the number of targets attached to an initiator can be increased to create a larger SAS domain.

Communication paths 126-5, 126-6 couple storage I/O interface circuit 114-1 to exchange data with storage access switch networks 108-1 and 108-3. Communication paths 126-1, 126-2 couple storage I/O interface circuit 114-2 to exchange data with storage access switch circuits 108-2 and 108-4. Communication paths 126-3, 126-4 couple storage I/O interface circuit 114-3 to exchange data with storage access network circuits 108-3 and 108-1. Communication paths 126-7, 126-8 couple storage I/O interface circuit 114-4 to exchange data with storage access switch networks 108-4 and 108-2. Thus, all Flash circuits 110-1 to 110-8 are accessible via the first internal network circuit 102-1 via the storage I/O interface circuits 114-1, 114-2 coupled to it, and all Flash circuits 110-1 to 110-8 are accessible via the second internal network circuit 102-2 via the storage I/O interface circuits 114-3, 114-4 coupled to it.

In some embodiments, the first and second packet processing circuits 118-1, 118-2 are implemented as field programmable gate array (FPGAs). The first programmable logic circuit 118-1 is operably coupled to first cache circuit 106-1. The second programmable logic circuit 118-2 is operably coupled to second cache circuit 106-2. In some embodiments, the first and second cache circuits include DRAM circuits. More particularly, in some embodiments the first and second cache circuits include Flash-backed DRAM circuits in which Flash circuits are coupled to stored data persistently in the event of failure of a corresponding DRAM circuit. The first and second packet processing circuits 118-1, 118-2 also are directly coupled to each other so that the same data can be cached at both. In some embodiments, a communication path 120 coupling the first and second programmable logic circuits includes a circuit connection compliant with a high speed network communication protocol. In some embodiments, the communication path 120 complies with the Ethernet protocol.

FPGA circuitry often can impart services with less latency delay, and therefore, faster than a typical general purpose management processor, for example, since the programmable logic can be programmed in advance to dedicate specific hardware circuitry to provide the services. Programmable hardware logic such as FPGA circuitry often can perform operations faster than a general purpose processor, for example, which often use software interrupts often to transition between different operations. Alternatively, in accordance with some embodiments, one or more of the packet processing circuits can include a special purpose processor, an application specific integrated circuit (ASIC), or an array of processors configured to run software to perform a given service.

Reconfigurable Circuitry

Figure 4A:
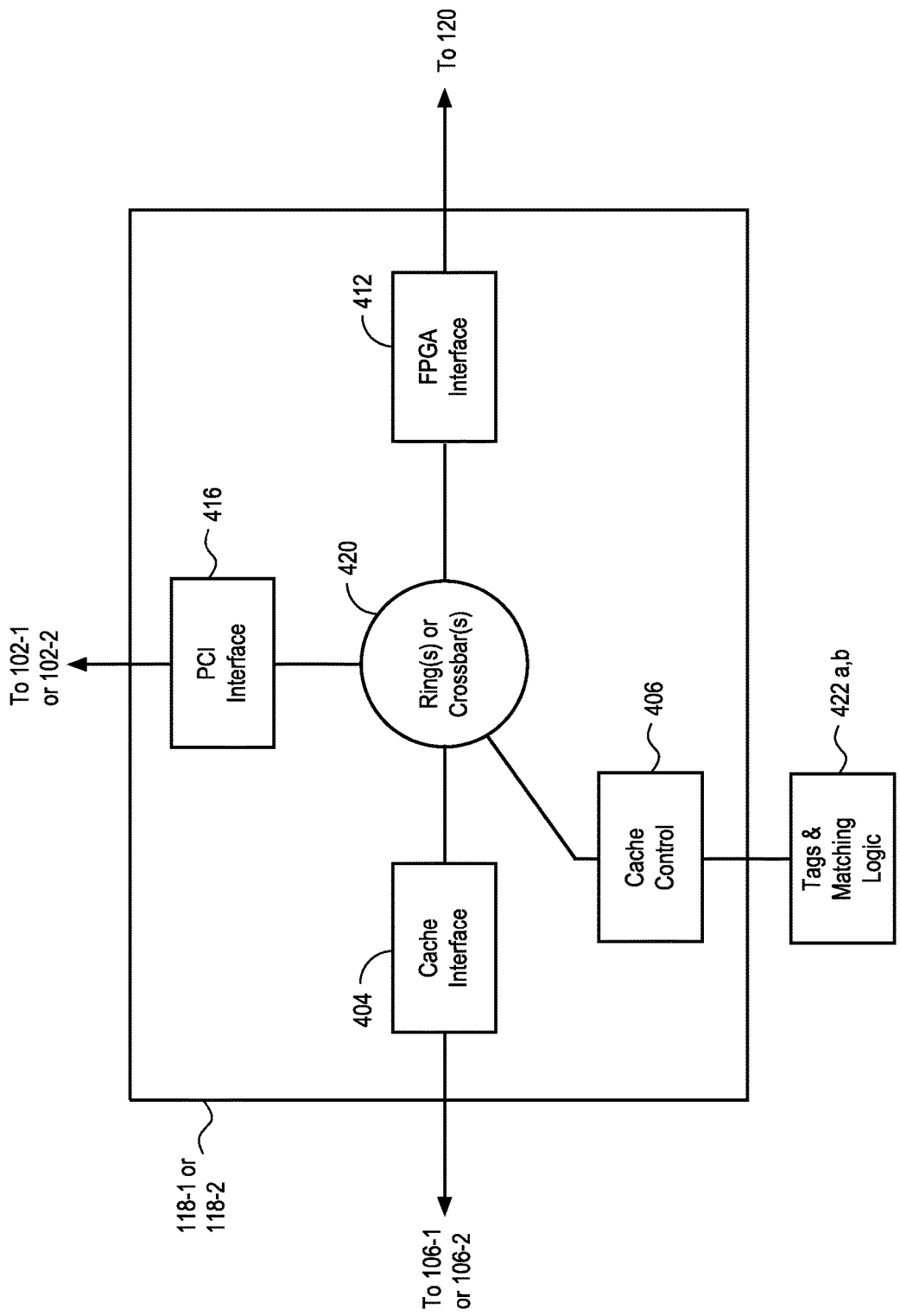
FIGS. 4A-4B illustrate additional details of each of the FPGAs included in the storage system according to some embodiments.
Figure 4B:
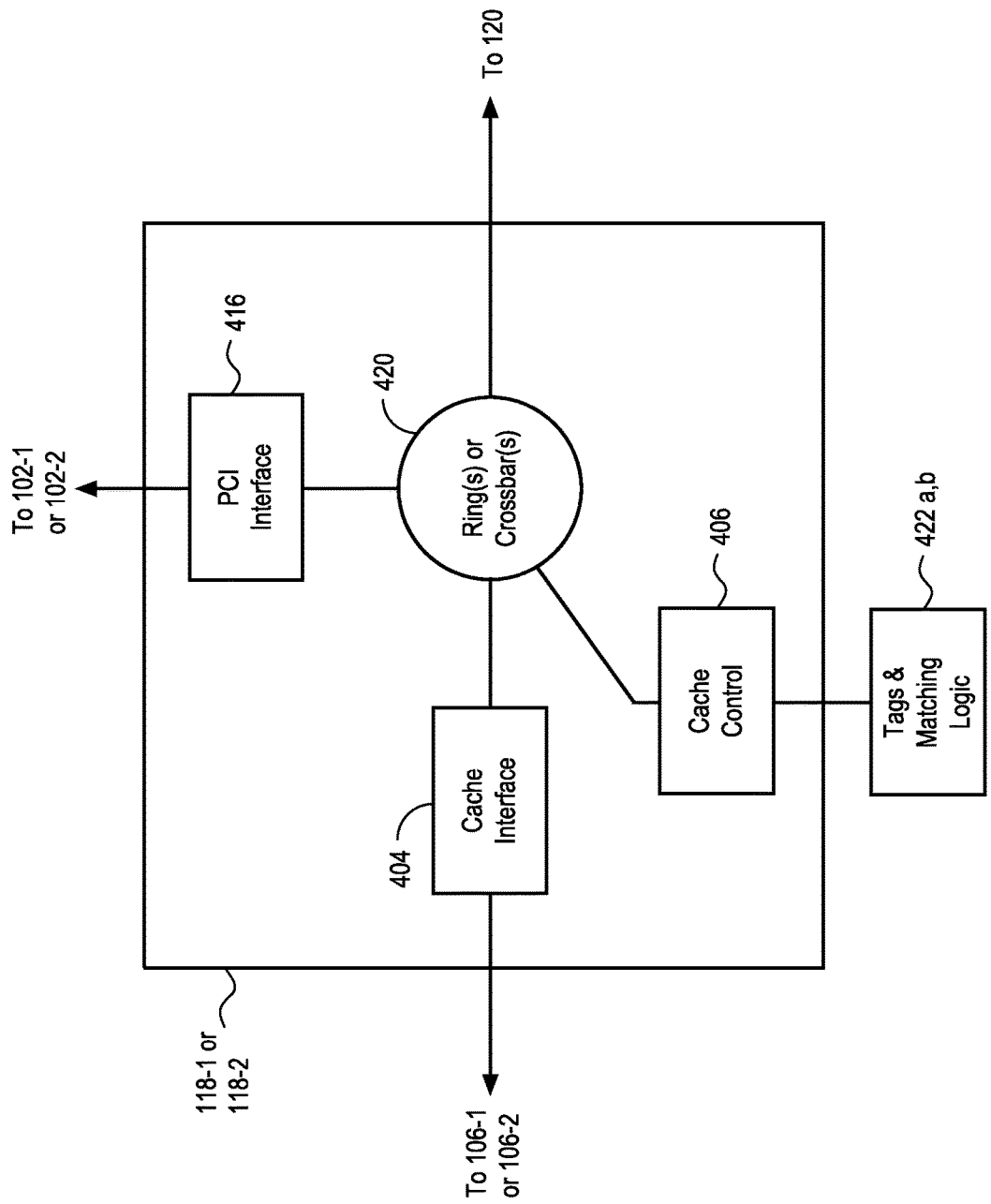

FIGS. 4A-4B are illustrative drawings showing additional details included in each of the packet processing circuits 118-1, 118-2 included in the storage system 100 according to some embodiments. One embodiment of each of the packet processing circuits 118-1, 118-2 architecture is shown in FIG. 4A. The packet processing circuits 118-1, 118-2 each comprises a cache interface 404, a cache control 406, a flash PCI interface 408 coupled to ring(s) or crossbar(s) 420 also included in the packet processing circuits 118-1, 118-2. The cache interface 404 couples to one of the cache modules 106-1, 106-2. The inter-FPGA interface 412 couples to the crossover path 120 to facilitate communication between the packet processing circuits 118-1, 118-2. The PCI interface 416 communicates with the one of the routing networks 102-1, 102-2. The cache control 406 couples to respective tags and matching logic modules 422a,b (only one shown) located external to the packet processing circuits 118-1, 118-2, respectively. In some embodiments, each of the tags and matching logic modules 422a,b comprises a ternary content addressable memory (TCAM).

Each of the cache interface 404, cache control 406, interface 412, PCI interface 416, and ring(s) or crossbar(s) 420 comprises circuitry (including logic in some instances) specifically configured to perform functionalities and operations as described in more detail below. The circuitry may comprise, for example, a plurality of logic components (also referred to as logic blocks), interconnects, memory elements (e.g., flip-flops or memory blocks), CPUs, and other circuit elements. All or just a portion of the packet processing circuits 118-1, 118-2 may be reconfigurable circuitry/hardware. For example, the cache control 406 may be reconfigurable circuitry/hardware while the other components of the packet processing circuits 118-1, 118-2 comprise non-reconfigurable circuitry/hardware. The packet processing circuits 118-1, 118-2 may comprise an application specific integrated circuit (ASIC) or an integrated circuit (IC) component in general.

Although not shown, the packet processing circuits 118-1, 118-2 may include additional memory, CPU, and/or processors to facilitate functionalities and operations of any of the cache interface 404, cache control 406, inter-FPGA interface 412, PCI interface 416, and/or ring(s) or crossbar(s) 420.

FIG. 4B illustrates an alternative embodiment of the packet processing circuits 118-1, 118-2 that is simpler than that shown in FIG. 4A. In FIG. 4B, the packet processing circuits 118-1, 118-2 comprises each of the cache interface 404, the cache control 406, and the PCI interface 416 coupled to the ring(s) or crossbar(s) 420 also included in the packet processing circuits 118-1, 118-2. The couplings and communications pertaining to these components are similar to those discussed above for FIG. 4A.

Cache Management Service

Some embodiments of the network storage system 100 are configured to provide a cache management service in order to handle data requests from the I/O circuits 320 at a faster rate than can be performed using HDDs, flash-based memory, or software. The packet processing circuits 118-1, 118-2, cache modules 106-1, 106-2, and tags and matching logic modules 422a,b facilitate faster handling of data communications using hardware circuitry. In some embodiments, the respective cache controls 406 (only one shown) included in the respective packet processing circuits 118-1, 118-2, controls data to and from the cache modules 106-1, 106-2 via the cache interface 404 and ring(s) or crossbar(s) 420 also included in the packet processing circuits 118-1, 118-2. The respective cache controls 406 included in the packet processing circuits 118-1, 118-2 also communicate with respective tags and matching logic modules 422a (only one shown) to control the cache modules 106-1, 106-2. Similarly, respective the cache controls 406 included in the respective packet processing circuits 118-1, 118-2 controls data to and from the cache modules 106-1, 106-2 via the cache interface 404 and ring(s) or crossbar(s) 420. The packet processing circuits 118-1, 118-2 (in particular, cache interface 404 and cache control 406), cache modules 106-1, 106-2, and tags and matching logic modules 422a,b are collectively referred to as the cache management subsystem.

From the perspective of the I/O circuits 112-1 to 112-4, it appears that all the data it needs to access and/or all the data it needs to store in the system 100 are provided from the cache modules 106-1 and/or 106-2. Thus, the cache modules appear to be an infinite cache. This is the case even though the flash modules 110-1 to 110-8 are the primary storage elements for the system 100 and the capacity of the cache modules 106-1, 106-2 is insufficient to hold all the data stored in the system 100.

The cache management subsystem is implemented within the system 100 to take advantage of features such as the access times for the cache modules 106-1, 106-2 (which include DRAMs) being approximately a thousand times or so faster than for the flash circuits 110-1 to 110-8. And unlike flash, which is limited to a certain number of writes before it degrades, DRAMs do not degrade. In some embodiments, the cache control 406 may comprise reconfigurable circuitry/hardware. In other embodiments, the cache control 406 may comprise non-reconfigurable circuitry/hardware.

The tags and matching logic modules 422a,b comprise hardware circuitry configured to hold at least a cache table (or similar data structure information) that correlates memory locations of the flash circuits 110-1 to 110-8 to memory locations of the cache modules 106-1, 106-2, respectively. In some embodiments, the tags and matching logic modules 422a,b comprise a type of hardware circuitry (e.g., TCAM) capable of very rapid searching or lookup of data stored within it.

FIG. 5A is an illustrative drawing representation of an example cache table 700 (or data structure) maintained in each of the tags and matching logic modules 422a,b for its respective corresponding cache modules 106-1, 106-2 according to some embodiments. The cache table 700 includes a plurality of fields such as, but not limited to, one or more tracking metrics 702, cache tags 704, and cache lines 706. The data storage memory space of the cache modules 106-1, 106-2 is apportioned as a plurality of cache lines, each cache line comprising a certain memory size according to a system setting or design choice. As an example, a cache line may be a certain number of bytes such as 32 bytes, 64 bytes, 128 bytes, 4,000 bytes, or other memory size that is a multiple of a block memory size of the flash modules 330. (Data is read from and written to the flash modules certain number of cells at a time, the set of number of cells referred to as a block.) Hence, a given cache module contains a certain number of cache lines based on its total data storage capacity and specified cache line size. Each cache line of a given cache module is represented as a row in the cache table 700. The cache table 700 may comprise a million or more rows of cache line entries.

Each row of the cache lines 706 may indicate, among other things, one or more of whether data is stored in that cache line data area, what portion of that cache line data area is empty or occupied, information about the stored data, and other information relating to the stored data and/or use of the cache line data area. Data stored in a given cache line is associated with a unique cache tag 704 (also referred to as a tag) that serves as an identifier or name for the data and/or the particular cache line. Each cache tag comprises one or more pieces of information including, but not limited to, the flash memory address corresponding to the data associated with the given cache tag. For example, the flash memory address may be included in an I/O request originating from one of the I/O circuits 112-1 to 112-4. As another example, if the particular data was obtained from the flash modules and then stored on the cache modules, the particular flash memory location(s) from which the data was taken is reflected in the corresponding cache tag. The cache tags are searched or looked-up to determine whether data associated with a given tag resides in the cache modules 106-1, 106-2.

Lastly, the data stored in each of a given cache line also has associated with it one or more tracking metrics 702 such as, but not limited to, age (e.g., when the data was written to the cache modules 106-1, 106-2 measured in number of CPU cycles), number of read requests for that data, number of write requests for that data, user specified information (e.g., data will be rarely accessed, data is to be stored in archival area of flash circuits 110-1 to 110-8, often used data, etc.), system known information (e.g., reconfigurable application engine 402 knows that the output data is generates will be rarely accessed data), and other data use information that can be tracked for statistical and/or cache management purposes. Tracking metrics 702 may also be referred to as data counters.

A backup copy of the cache table 700 is maintained at all times within the system 100. For instance, if the tags and matching logic modules 422a,b comprise TCAMs, then in the case of power failure, the cache table 700 will be lost. To ensure against such a scenario, a duplicate copy of the cache table 700 can be maintained within the packet processing circuits 118-1, 118-2.

Figure 5B:
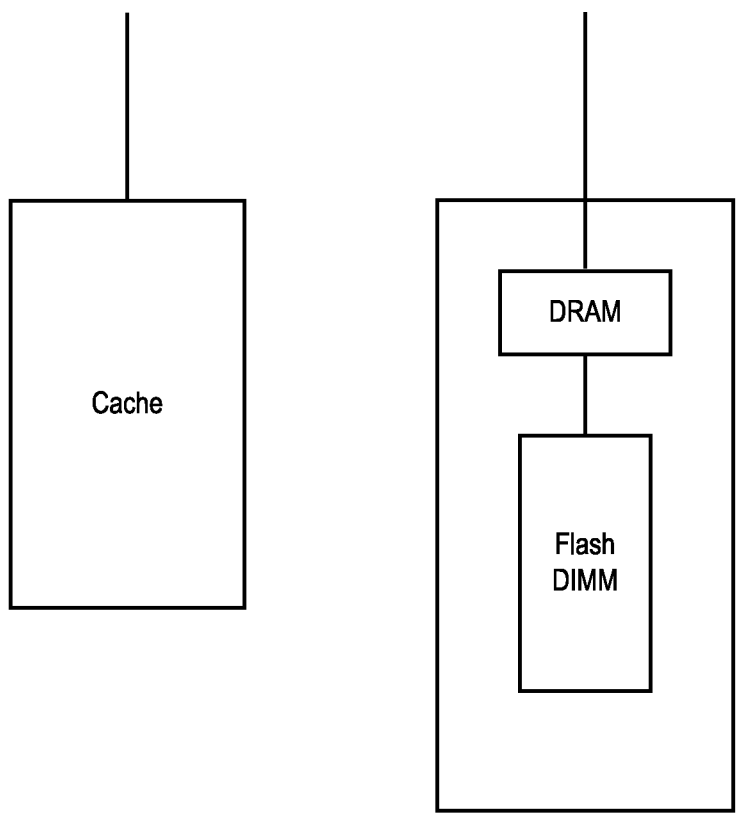
FIG. 5B is a block diagram depicting a dual inline memory module containing DRAM and flash memory, as may be used in example embodiments.

FIG. 5B is an illustrative block diagram that depicts a dual inline memory module containing DRAM and flash memory, which in accordance with some embodiments, can be plugged into a standard DDR3 DIMM socket. In some embodiments, during operation the module behaves similar to a standard DDR3 DRAM DIMM, however, upon the occurrence of the events specified below, data is copied between the DRAM and flash. The entire contents of on-board DRAM are written to flash upon the occurrence of any of the following:

If configured to do so: A drop in supply voltage is detected by an on-board circuit. Super-capacitors supply power to the Cache module to complete this operation.
 A SAVE command is received via the I2C interface on the DIMM socket.
 An interrupt is received via a pin on the DIMM socket.

The contents of flash are written to DRAM upon occurrence of any of the following events:

If configured to do so: After power up if a valid saved image is detected in flash.
 A RESTORE command is received via the I2C interface on the DIMM socket.

Figure 6A:
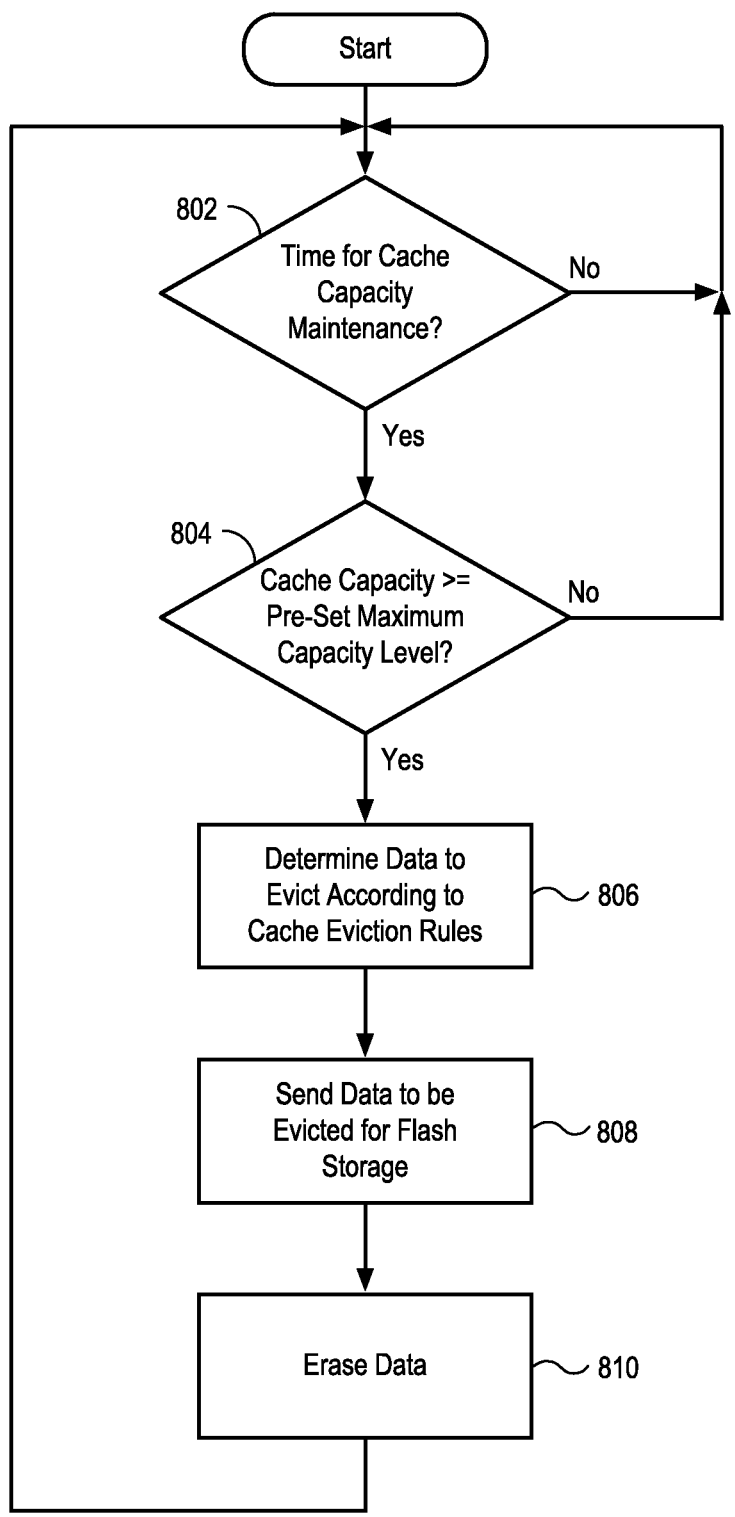
FIGS. 6A-6C illustrate example flow diagrams showing caching principles, policies, or rules implemented by the cache management subsystem included in the FPGAs according to some embodiments.
Figure 6B:
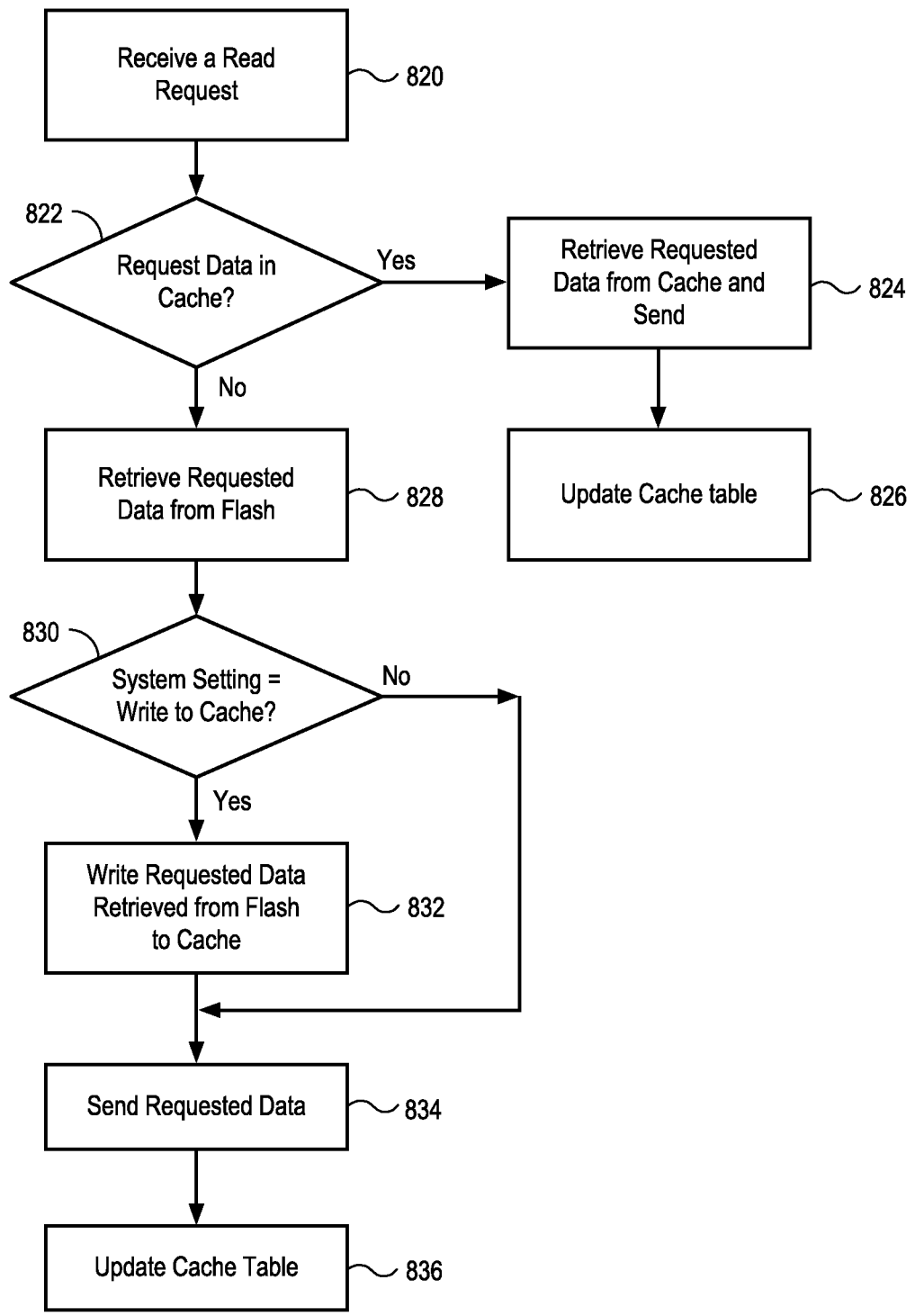
Figure 6C:
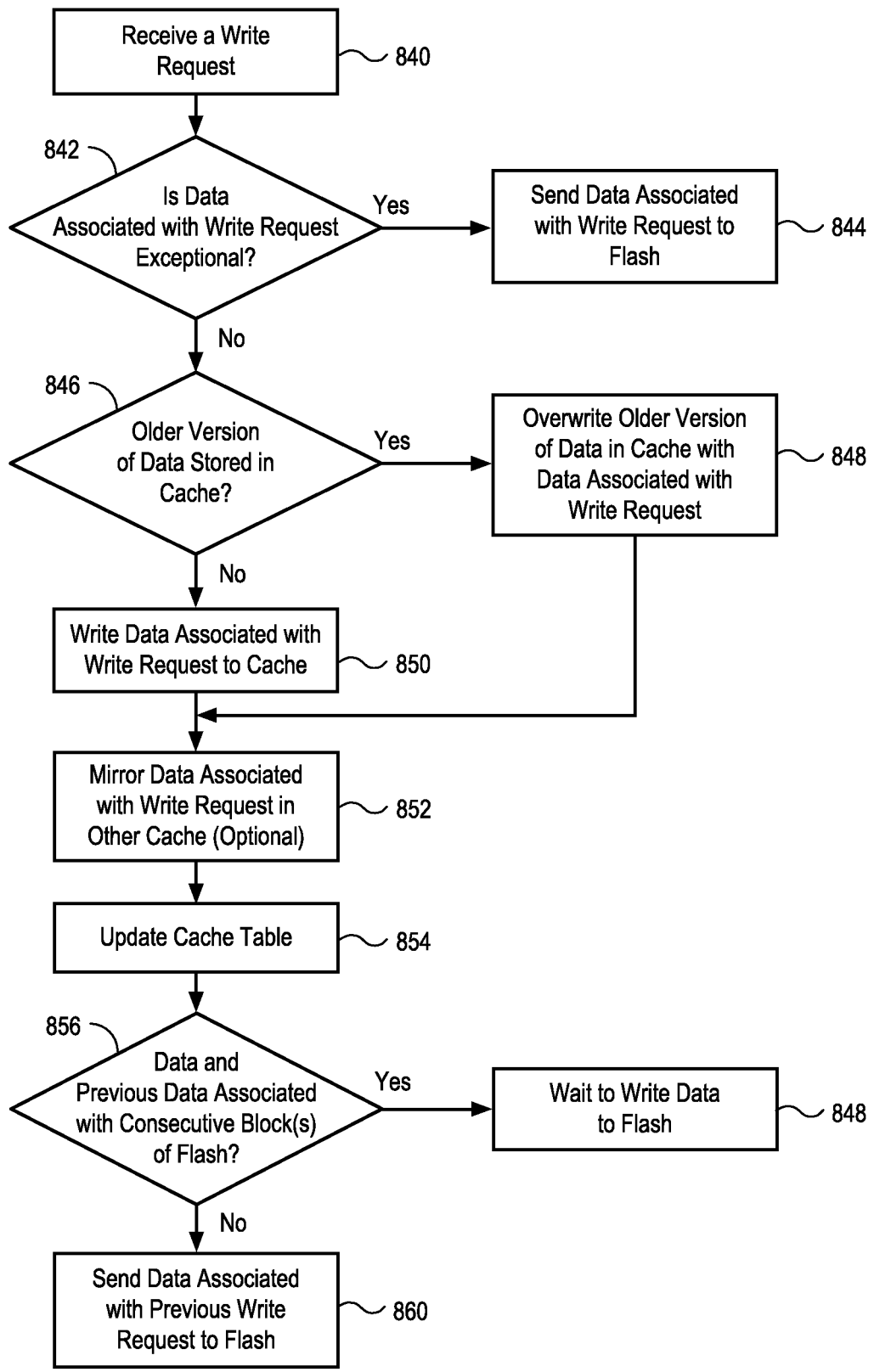

FIGS. 6A-6C are illustrative drawings showing example flow diagrams representing caching principles, policies, or rules implemented by the cache management subsystem 406 of FIGS. 4A-4B according to some embodiments. The cache control 406 in each of the packet processing circuits 118-1, 118-2 perform cache capacity management operations for its cache modules 106-1, 106-2 respectively, to ensure that the cache modules always have sufficient capacity to handle I/O requests. If cache capacity is not adequately monitored and optimized, for example, there may not be enough space to fully handle a new write request. Cache management for cache modules are performed independently of each other. Although FIGS. 6A-6C are shown as distinct flow diagrams from each other, it is understood that one, two, or all of these flow diagrams may be implemented at any given time during operation of the system 100. Especially because the system 100 handles many I/O requests from the I/O circuits 112-1 to 112-4 at any given time and the cache management subsystem itself also performs background operations that may or may not be directly triggered by a given I/O request.

Referring to FIG. 6A, module 802 determines whether it is time to perform cache capacity maintenance. Maintenance may be a continuous background operation, a periodic background operation, or on a need basis type of operation. Maintenance frequency can be a system setting, user setting, or dynamic setting based on current operating conditions of the system 100. If maintenance is initiated (yes branch of block 802), then the cache control 406 determines whether the current data storage capacity of the cache modules 106-1 or 106-2 (depending on which set of cache modules is associated with the given cache control 406) is at or above a pre-set maximum capacity level (block 804). The pre-set maximum capacity level is a certain value that is pre-set by the system 100 or user, and represents the portion of the total data storage capacity of the cache modules that can be occupied while having a "safe" amount of available space in case, for example, an unexpectedly large write request is received. Examples of pre-set maximum capacity level include, but are not limited to, 70%, 80%, or some other value. In some embodiments, the pre-set maximum capacity level may be adjusted over time as more system usage information becomes available. Instead of expressing the pre-set maximum capacity level as a percentage of the total data storage capacity, for example, it is understood that it can be expressed as a minimum available or reserved free space.

If the current cache capacity is below the pre-set maximum capacity level (no branch of block 804), then the flow diagram returns to block 802. Otherwise the current cache capacity is too close to the pre-set maximum capacity level, and some of the stored data needs to be moved to the flash modules 330 and evicted or erased from the cache modules 106-1 or 106-2 (depending on which set of cache modules is associated with the given cache control 406) (yes branch of block 804).

Next at a block 806, the cache control 406 determines what data to displace from the cache modules 106-1 or 106-2 (depending on which set of cache modules is associated with the given cache control 406) according to a set of cache eviction rules. In some embodiments, the cache eviction rules may comprise an algorithm implemented in software. The cache eviction rules may be set by the system 100 or a user. The cache eviction rules may comprise one or more rules, and if it comprises more than one rule, rules may have a priority order relative to each other, a certain rule may override another rule, two rules in combination may override a third rule, or the like. Example cache eviction rules comprise, without limitation:

Evict data in cache line having the least amount of write activity

Evict data in cache line based on age (e.g., oldest)

Evict data in cache line having the least amount of reads

Evict or keep data in cache line based on user specified directive (e.g., user specified that certain data will be often used, rarely used, or be archival data)

Evict or keep data in cache line based on other sources (e.g., reconfigurable application engine 402 specified that certain data will be often used, rarely used, or be archival data)

The cache control 406 checks the cache table 700 included in its corresponding tags and matching logic module 422, and in particular, compares the information provided in the tracking metrics 702 field of the cache table 700 for all cache lines containing data against each other according to the cache eviction rules. In one embodiment, the cache eviction rule may comprise evicting data stored in the cache line(s) that is the least written. In another embodiment, the cache eviction rule may comprise evicting data stored in the cache line(s) that is the least written except for data that is "pinned" to stay within the cache based on a user specified directive.

Once the cache line(s) to empty are identified, the cache control 406 sends data stored in those cache line(s) to the flash modules 110-1 to 110-8 for storage (block 808). Such data is erased, emptied, or evicted from those particular cache line(s) at a block 810. The flow diagram then returns to block 802. Thus, the cache capacity of cache modules 106-1 or 106-2 (depending on which set of cache modules is associated with the given cache control 406) is maintained at or below the pre-set maximum capacity level. It is understood that blocks 808 and 810 may occur simultaneously of each other.

FIG. 6B illustrates operations performed by the cache management subsystem in connection with a data read request from any of the I/O circuits 112-1 to 112-4. At a block 820, the cache control 406 receives a read request originating from one of the I/O circuits 112-1 to 112-4. In some embodiments, read requests originating from I/O circuits are handled by the cache control 406 included in the packet processing circuits 118-1, 118-2 (for normal operational state of the system 100), and read requests originating from I/O circuit 112-1 to 112-4 are handled by the cache control 406 included in the packet processing circuits 118-1, 118-2 (again, assuming normal operational state of the system 100). The data request includes a particular memory address location of the flash modules 110-1 to 110-8 at which the requested data is stored.

Next at a block 822, the tags and matching logic module 422a or 422b (corresponding to the particular cache control 406 handling the read request) performs a look-up of its cache table 700 to determine whether the requested data exists in the cache modules 106-1, 106-2. The cache tags 704 are searched to see which one, if any, contains the same flash memory address location as the particular memory address location provided in the data request. In one embodiment, all of the cache tags 704 in the cache table 700 may be searched (fully associative). In another embodiment, a subset of the cache tags 704 may be searched (set associative). In an alternative embodiment, a particular one of the cache tags 704 may be searched (direct mapped). The tags and matching logic module 422 is configured to perform the look-up function several orders of magnitude faster than may be possible if the cache table 700 resides in the packet processing circuits 118-1, 118-2, for example. This may be the case even if there are a large number of rows (e.g., cache lines) in the cache table 700, such as thousands of rows.

If a matching cache tag is found (yes branch of block 822), the cache control 406 accesses the data corresponding to the matching cache tag from the cache module 106-1, 106-2 and sends the retrieved data to the originating I/O circuit (block 824). The retrieved data is the requested data in the read request. The tracking metrics 702 for at least that data is updated in the block 826. For example, the counter for the number of reads of that data may be incremented by one. If the retrieved data was previously written to the cache module 106-1, 106-2 (in a previous write request) and such data was not evicted from the cache module due to cache management operations (see FIG. 6A), then such data is present in the cache module for later access such as the present read request. Then there is no need to retrieve the data from the flash modules 110-1 to 110-8. Data retrieval from a DRAM cache is significantly faster than from flash-based memory, upwards of a thousand times faster using cache than flash.

If no matching cache tag is found (no branch of block 822), the requested data is not present in the cache modules 106-1, 106-2 and is retrieved from the flash modules. At a block 828, the cache control 406 initiates retrieval of the requested data from the appropriate flash modules. Next at a block 830, a system setting (or user specified setting) is checked to see whether the requested data retrieved from one or more of the flash modules 110-1 to 110-8, should be copied to the cache modules. If the system is set not to copy to cache modules (no branch of block 830), then the flow diagram proceeds to block 834. Otherwise the retrieved data is copied to the cache modules (yes branch of block 830 and block 832).

The retrieved data is also sent by the cache control 406 to the I/O circuit, one of 112-1 to 112-4 that made the read request (block 834). The cache table 700 is correspondingly updated at a block 836. Because data is written to particular cache line(s) of the cache modules 106-1, 106-2 that did not exist before, the cache tags 704 and cache lines 706 fields for those cache line(s) are populated accordingly. The associated tracking metrics 702 are also populated, at least, for example, the age field.

Although blocks 830 and 832 are shown prior to block 834 in FIG. 6B, it is contemplated that block 834 and blocks 830/832 may be performed simultaneously to each other or in reverse order from that shown in FIG. 6B.

FIG. 6C is an illustrative flow diagram representing operations performed by the cache management subsystem in connection with a data write request from any of the I/O circuits 110-1 to 110-8 in accordance with some embodiments. At a block 840, the cache control 406 receives a write request originating from one of the I/O circuits 112-1 to 112-4. In some embodiments, write requests originating from I/O circuits are handled by the cache control 406 included in the packet processing circuits 118-1, 118-2 (for normal operational state of the system 100), and write requests originating from the I/O circuits 112-1 to 112-4 are handled by the cache control 406 included in the packet processing circuits (again, assuming normal operational state of the system 100). The data request includes the data to be written as well as a particular memory address location of the flash modules at which the data is to be written.

At a block 842, the cache control 406 determines whether the data associated with the write request is exceptional. While the default rule is to store all data associated with write requests to the cache modules packet processing circuits 106-1, 106-2 and then from the cache modules, copy to the flash modules 110-1 to 110-8 (at some later point in time), one or more exceptions to the default rule may be implemented. One or more exception criteria may be a system setting or user specified setting. For example, the exception may comprise there being no exception to the default rule. As another example, data exceeding a certain size (e.g., data that if written to the cache modules may exceed the cache capacity or likely to exceed the pre-set maximum capacity level) may warrant storing directly in the flash modules without first storing in the cache modules. As still another example, the write request or the data associated with the write request itself may specify that the data will be rarely accessed (e.g., is archival data) or has a certain characteristic that warrants being stored directly in the flash modules 110-1 to 110-8 without first being stored in the cache modules 106-1, 106-2.

If the data associated with the write request is determined to be exceptional (yes branch of block 842), then the cache control 406 sends such data to be written to the flash modules 110-1 to 110-8 (block 844). Otherwise the data associated with the write request is not exceptional (no branch of block 842) and operations are performed to write to the cache modules 106-1, 106-2. At a block 846, the tags and matching logic module 422 checks the cache table 700 for a cache tag containing the same flash memory address location as provided in the write request. If a matching cache tag is found (yes branch of block 846), this means that an older version of the data associated with the write request (or some data in general) is currently stored in the cache line(s) now intended for the data associated with the write request. The cache control 406 facilitates overwriting the existing data at these cache line(s) with the data associated with the write request (block 848). Then the flow diagram proceeds to block 852.

If no matching cache tag is found (no branch of block 846), then the cache control 406 facilitates writing the data associated with the write request to empty/available cache line(s) in the cache modules 106-1, 106-2 (block 850).

Next at a block 852, the data associated with the write request is additionally copied to empty/available cache line(s) in the cache modules 355 associated with the other FPGA packet processing circuit. This mirroring of data between the cache modules 106-1, 106-2 occurs via the interface 412 and the crossover path 120 connecting the packet processing circuit 118-1 to packet processing circuit 118-2. In some embodiments, block 852 is optional when the crossover path 383 is omitted from the storage system 100. In other embodiments, the mirroring of data associated with the write request in both cache modules 106-1 and 106-2 is initiated before the write request is received at a given packet processing circuit. The write request from the I/O circuit is split into two identical requests, one going to the packet processing circuit 118-1 and the other to the packet processing circuit 118-2. Then the cache control 406 in each of the packet processing circuits can store the data associated with the write request (also referred to as write data) in its respective cache modules. At a block 854, the cache table 700 included in the tags and matching logic module 422 is updated to reflect the addition of the data associated with the write request into certain cache line(s) of the cache modules.

Because flash modules 110-1 to 110-8 comprise the primary or permanent data storage medium for the storage system 100, the data associated with the write request, although already written to the cache modules 106-1, 106-2 (see blocks 848 and 850), is eventually written to the flash modules 110-1 to 110-8. Nevertheless, the cache management subsystem is configured to intelligently perform data writes to the flash modules taking into account the characteristics of the flash modules. In order to prolong the usability of flash modules, which are limited to a certain number of writes before degrading, the cache management subsystem accumulates certain type of data corresponding to a plurality of write requests and then performs a single write of the accumulated data to flash modules rather than performing a write to flash modules for each write request. This means that if, for example, there are 25 write requests, instead of writing to flash modules 25 times, once for each of the 25 write requests, the data corresponding to these 25 write requests may be written at the same time and once (e.g., a single write operation) to the flash modules.

After the data associated with the write request is written to a cache module 106-1, 106-2 and cache table 700 updated accordingly, the cache control 406 determines whether the data associated with the write request and data associated with a previous write request are associated with consecutive block(s) of the flash modules 110-1 to 110-8 (block 856). Both the data associated with the write request and data associated with a previous write request are handled by the same cache control 406. If both data are associated with consecutive block(s) of the flash modules (yes branch of block 856), then the cache control 406 waits to write data associated with the write request and the data associated with previous write request to flash modules 330 (block 858). The cache control 406 accumulates data to be written to the flash modules. If the two data are associated with non-consecutive block(s) of flash modules (no branch of block 856), then the cache control 406 sends data associated with the previous write request to be written in flash modules (block 860).

Accordingly, the cache management subsystem is configured to act as a middleman between the I/O circuits 112-1 to 112-4 and flash modules 110-1 to 110-8 for every read and write requests from the I/O circuits. For all read and write requests, the presence of data associated with the read or write request in the cache modules 106-1, 106-2 is checked before the flash modules are involved. Based on the presence or absence of such data in the cache modules, the cache management subsystem performs optimization operations to complete the data requests significantly faster than is possible with flash modules alone. The cache management subsystem also prolongs the useful lifespan of flash modules by minimizing the number of writes to flash modules without sacrificing completeness of data being stored in the flash modules. Data associated with write requests are written to cache modules (prior to be written to flash modules) unless the data fits an exception. Data associated with read requests that are retrieved from the flash modules may or may not be written to cache modules (depends upon system or user setting). Data associated with write requests similarly may or may not be written to cache modules corresponding to both packet processing circuits (depends upon system or user setting). The cache management subsystem actively maintains the used storage capacity level of the cache modules at or below a pre-set capacity level (e.g., 70%, 80%, etc.) by evicting data stored in the cache modules that fit one or more eviction rules, as needed. An example of an eviction rule comprises evicting data that has the least amount of write activity (and moving it to the flash modules).

Additional Services

In accordance with some embodiments, the services imparted by the packet processing circuits 118-1, 118-2 may alter packet payload content, and may include one or more of encryption/decryption, duplication/de-duplication, compression/de-compression, processing, replication and/or snapshot, for example.

An encryption service can be used, for example, to encode packet information in such a way that only authorized parties can read it. In a typical encryption scheme, for example, information, referred to as plaintext, is encrypted using an encryption algorithm, turning it into an unreadable ciphertext. A decryption service provides the reverse of an encryption service. Moreover different styles of encryption and decryption may be provided, and each different style may constitute a different service.

A de-duplication service also can be used, for example, to reduce physical space occupied by a data block within a packet. Raw data sometimes contains entire repeated blocks. A common example is an email database in which emails to several individuals contain identical attachments. Some de-duplication services keep a lookup table with en entry for each data block seen so far, and when it detects duplicate blocks it replaces the duplicate data with a pointer to the data of the first block seen. A duplication service provides the reverse of a de-duplication service.

A compression service can be used, for example, to reduce the physical storage space occupied by a data block within a packet. For example, some compression processes recognize patterns within the data and replace raw data with more compact patterns. For example, in run-length encoding, a string of twenty "a" characters could be replaced by the string "20a" which occupies only three characters. A de-compression service provides the reverse of a compression service.

In some embodiments, services imparted by the packet processing circuits do not alter packet payload content, and may include may include cache storage or general parsing services, for example. For example parsing services may involve setting up a parsing table, paring packets using the parsing table, and extracting information fields from packets and acting upon the extracted information. Conversely, services may include the reverse of parsing in which packet generation tables are set up, and packets are generated from input data fields combined with instructions in the packet generation tables. Services may include counting services in which a programmable logic resource circuit is informed of events in the system, such as packets read/written or bad packets, or packet latency times, and using these events it updates internal counters, and later responds to queries by delivering the counters. Moreover different styles of compression and de-compression may be provided, and each different style may constitute a different service.

A replication service can be used to broadcast a packet to multiple storage sites for high availability, for example. A packet may be received that specifies a write of data to a particular LUN, for example. A replication service can recognize that the data should be written to multiple LUNs rather than only to the specified LUN. The replication service can create multiple different packets, each containing header information to designate a write of the data to a different LUN located at a different storage site (not shown). The replication service can cause the multiple different packets to be broadcast to geographically dispersed storage sites so as to provide backup storage of the data and/or so as to store the data at a site that is physically closer to where a user likely to use it is located.

A snapshot service can be used to capture additional writes to a LUN that occur while a LUN is being backed-up, for example. The data in a LUN may be backed up periodically to a different storage location, for example. During the backup operation, new data may be written to the LUN. A snapshot service creates a "snapshot", i.e. a copy of the LUN, at the moment that the backup operation begins, and during the course of the backup operation new write data is written to the snapshot rather than to the LUN that is being backed up. Upon completion of the backup, blocks, e.g., Logical Block Addresses, within the snapshot that are written to during the snapshot are copied to the backup storage and also to the LUN that has been backed up. Thus, backup can proceed without loss of write data received during the backup.

Routing Management

Figure 7:
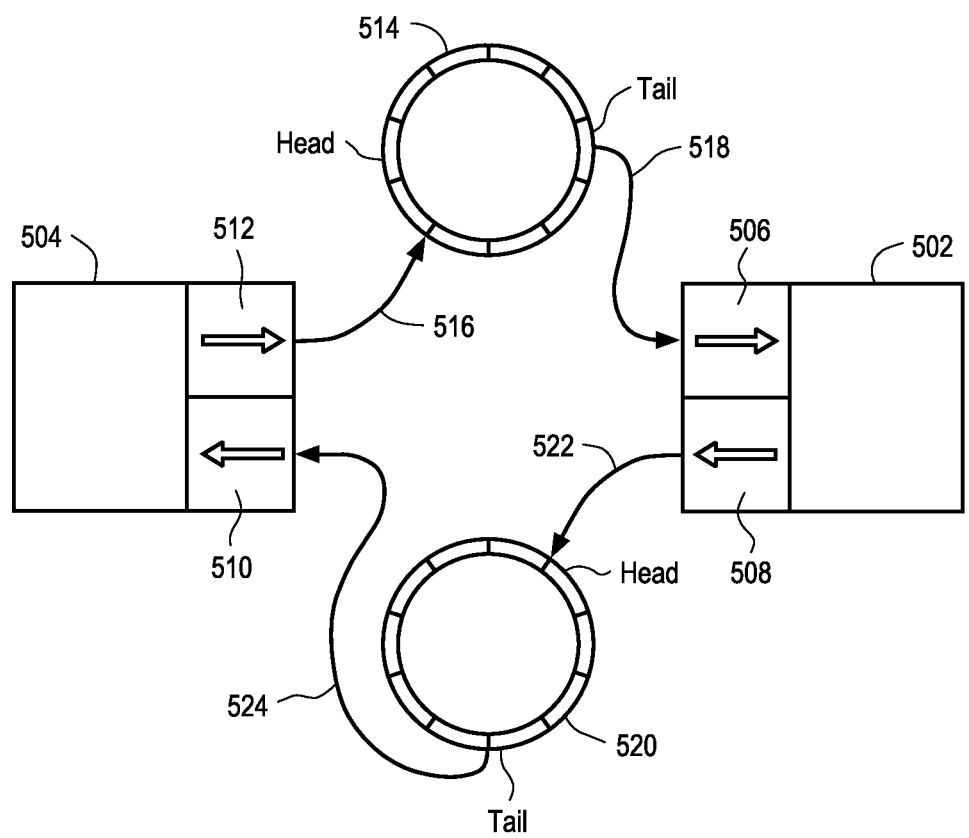
FIG. 7 is an illustrative drawing representing a producer-consumer relationship between first and second endpoints in accordance with some embodiments.

FIG. 7 is an illustrative drawing providing a generalized representation of a producer-consumer relationship between the management processors and other endpoints coupled to the management processors across the packet networks. More particularly, one of the first and second management processors 116-1 or 116-2 implements the first illustrative endpoint 502, and one of the I/O circuits 112-1 to 112-2, packet processing circuits 118-1, 118-2 and the RAID I/O circuits 114-1 to 114-4 implements the illustrative second endpoint 504 includes one of the. Each of the first and second endpoints produces data that is consumed by the other, and each of the first and second endpoints consumes data produced by the other. The first 502 endpoint includes a first input queue 506 and a first output queue 508. The second endpoint 504 includes a second input queue 510 and a second output queue 512. A receive ring buffer 514 is configured as indicated by arrow 516 to receive data packets from the second output queue 512 and is configured as indicated by arrow 518 to provide data packets to the first input queue 506. A transport ring buffer 520 is configured as indicated by arrow 522 to receive data packets from the first output queue 508 and is configured as indicated by arrow 524 to provide data packets to the second input queue 510. The receive ring buffer 514 and the transport ring buffer 520 are FIFO ring buffers implemented within the local memory 117-1 or 117-2, which are accessible by the management processors 116-1, 116-2, respectively.

In accordance with some embodiments, the management processors 116-1, 116-2 manage routing of packets over the routing networks 102-1, 102-2 to and from the I/O circuits 112-1 to 112-2, packet processing circuits 118-1, 118-2 and the RAID I/O circuits 114-1 to 114-4. The receive and transmit ring buffers 514, 520 are used in some embodiments to synchronize the flow of data packets during direct memory access (DMA) transmission of information to and from each of the I/O circuits 112-1 to 112-2, packet processing circuits 118-1, 118-2 and the RAID I/O circuits 114-1 to 114-4 and the local memory 117-1 or 117-2, which are accessed by the management processor 116-1, 116-2.

Persons skilled in the art will understand that a typical ring buffer includes a FIFO data structure that defines a circular queue. In general, a ring buffer is used to serialize data from one process to another process. The serialization allows some elasticity in time between the processes. A ring buffer typically has two indices to storage elements in the queue: a head and a tail, indicated for the illustrative ring buffers 514, 520 of FIG. 7. In operation, data is inserted at a ring buffer element indicated by the head index to be the head element, and data is removed from a ring buffer element indicated by the tail index to be the tail element. Initially, the head and tail have the same buffer location value, typically zero, indicating that the ring buffer is empty.

As the buffer fills up with data, the tail pulls away from the head. The ring buffer will be full when the tail gets so far ahead of the head that it wraps around and catches up to the head. As the head catches up to the tail, the buffer empties. The ring buffer will be empty once again when the head completely overtakes the tail.

In operation, when the first endpoint 502 operates as a producer and the second endpoint 505 operates as a consumer, the first endpoint 502 provides one or more data packets to the first output queue 508, which outputs the one or more data packets to the head of the transport ring buffer 520, and transport ring buffer 520 provides the one or more data packets at its tail to the second input queue 510, which inputs the packet to the second endpoint 504. Conversely, when the first endpoint operates as a consumer 502 and the second endpoint 504 operates as a producer, the second endpoint 504 provides one or more data packets to the second output queue 512, which outputs the one or more data packets to the head of the receive ring buffer 514, and receive ring buffer 514 provides the one or more data packets to the first input queue 506, which inputs the packet to the first endpoint.

Figure 8:
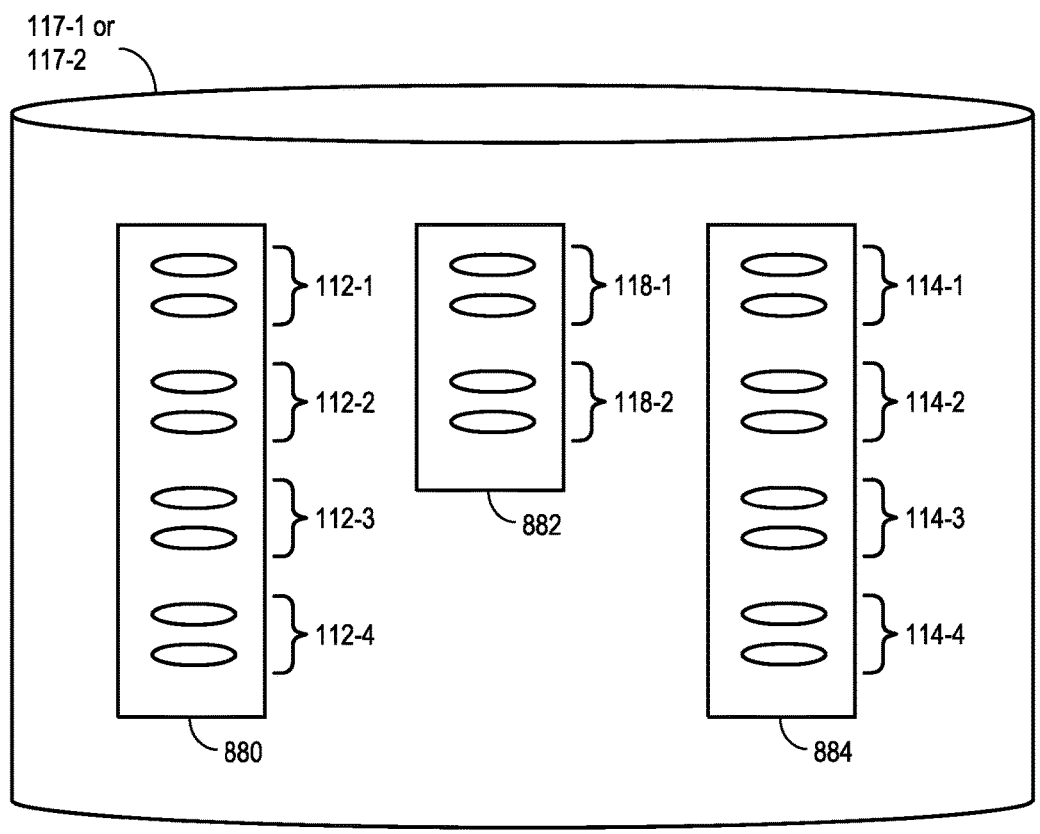
FIG. 8 is an illustrative drawing representing pairs of receive and transmit ring buffers created within local memory for the I/O circuits, packet processing circuits and the RAID I/O circuits in accordance with some embodiments.

FIG. 8 is an illustrative drawing representing pairs of receive and transmit ring buffers created within local memory 117-1 for the I/O circuits 112-1 to 112-2 (within dashed lines 880), packet processing circuits 118-1, 118-2 (within dashed lines 882) and the RAID I/O circuits 114-1 to 114-4 (within dashed lines 884) in accordance with some embodiments. Although the pairs of receive and transmit ring buffers are shown within the first local storage 117-1, it will be appreciated that similar sets of pairs of ring buffers can be produced in local memory 117-2. Thus, ring buffer pairs can be allocated in local memory 117-1, 117-2 to each of the I/O circuits 112-1 to 112-2, packet processing circuits 118-1, 118-2 and the RAID I/O circuits 114-1 to 114-4 for use in their operation in a producer consumer relationship with the management processor 116-1, 116-1, respectively, as generally described with reference to FIG. 7.

Figure 9:
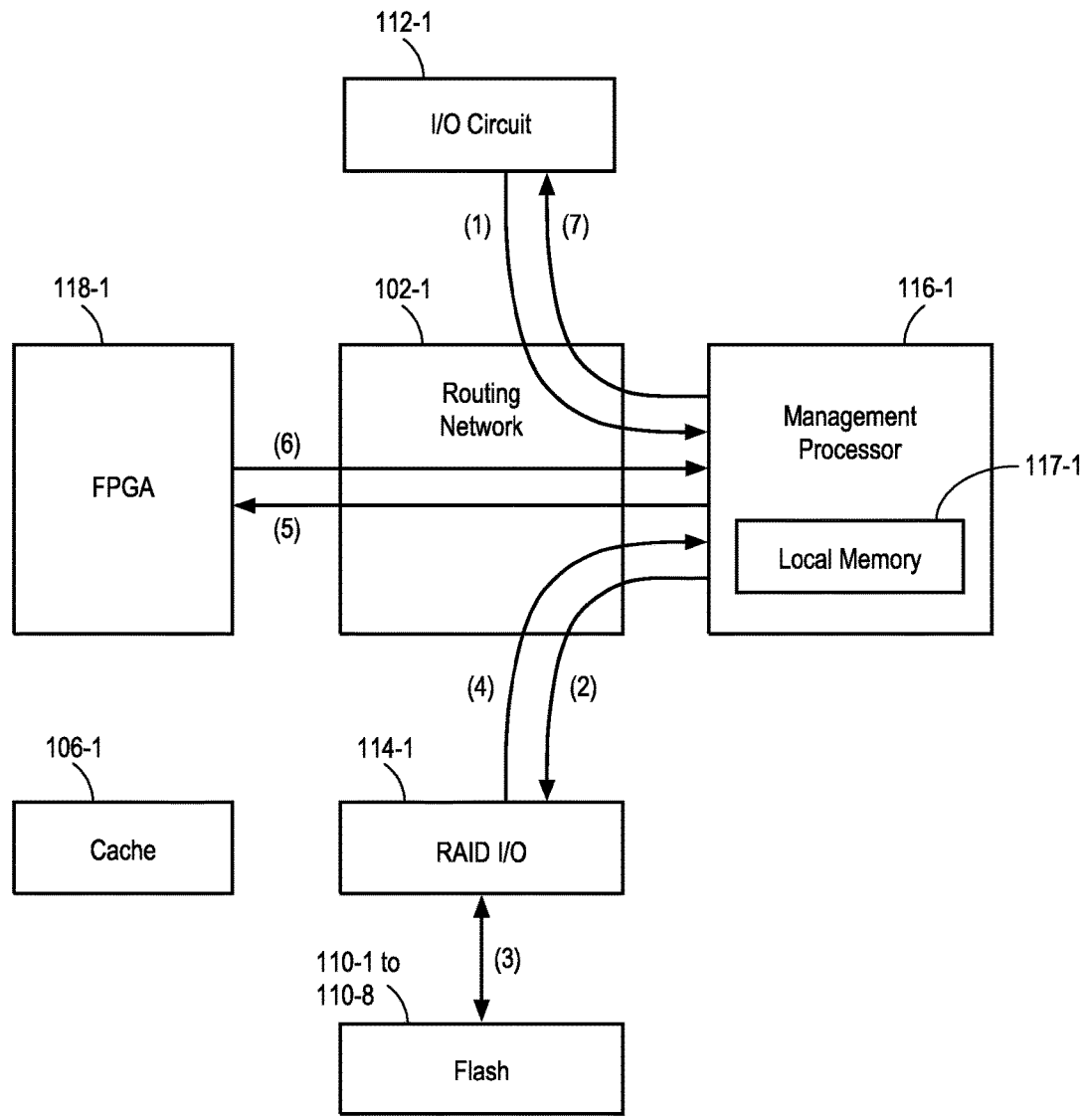
FIG. 9 is an illustrative drawing showing a first example routing of a data packet over the packet network under control of management processor so that a service is imparted to the packet as it proceeds between an I/O circuit and Flash storage, one or more of in accordance with some embodiments.

FIG. 9 is an illustrative drawing showing a first example routing of a data packet over the packet network 102-1 under control of management processor 116-1 so that a service is imparted to the packet as it proceeds between an I/O circuit 112-1 and Flash storage, one or more of 110-1 to 110-8, in accordance with some embodiments. It will be appreciated that FIG. 9 shows only a portion of the system 100 in order to simplify the explanation. In the data packet routing example illustrated in FIG. 9, a data packet has a selected service imparted to it by processing circuit 118-1.

Still referring to FIG. 9, assume that a packet containing a read request (1) is transmitted from I/O circuit 118-1 over the routing network 102-1 to the management processor 116-1. Assume that in response to the read request, the management processor 116-1 determines to send the packet (2) over the network 102-1 to the RAID controller 114-1 to request the read. The RAID controller 114-1 manages reading the requested data (3) from one or more Flash circuits 110-1 to 110-8. In response to obtaining the read data, the RAID controller 114-1 sends one or more packets contacting the read data (4) to the management processor. Next, the management processor 116-1 determines to send the one or more data packets (5) to the packet processing circuit 118-1, which is configured to impart a service. The imparted service can include encryption/decryption, duplication/de-duplication, compression/de-compression, replication, snapshot, for example. After imparting the service to the one or more read data packets, the processing circuit 118-1 sends the one or more read data packets (6) over the routing network 102-1 to the management processor 116-1. Next, the management processor 116-1 determines to transmit the one or more read data packets (7) over the network 102-1 to the I/O circuit 118-1.

Figure 10:
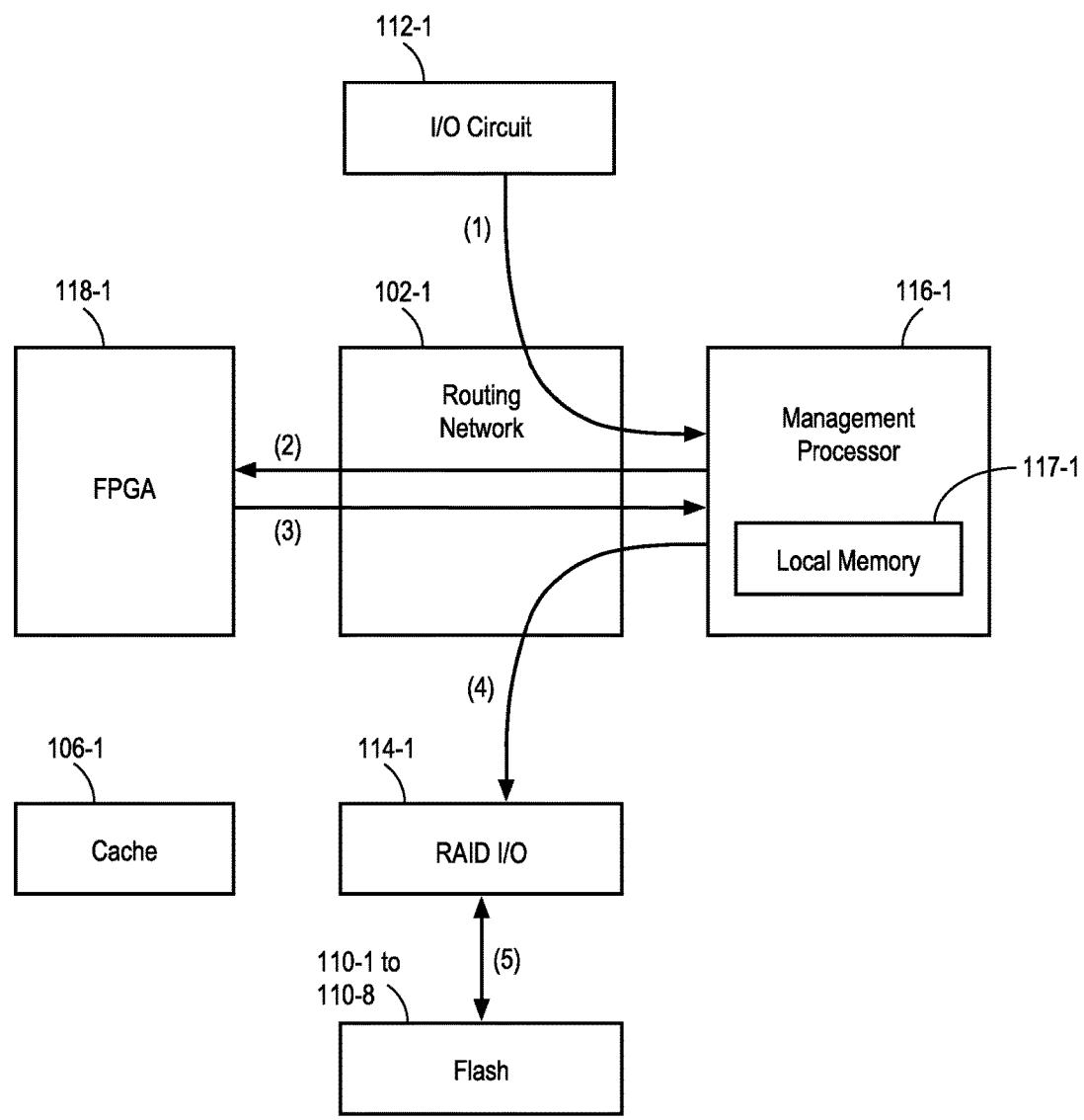
FIG. 10 is an illustrative drawing showing a second example routing of a data packet over the packet network under control of management processor so that a service is imparted to the packet as it proceeds between an I/O circuit and Flash storage, one or more of in accordance with some embodiments.

FIG. 10 is an illustrative drawing showing a second example routing of a data packet over the packet network 102-1 under control of management processor 116-1 so that a service is imparted to the packet as it proceeds between an I/O circuit 112-1 and Flash storage, one or more of 110-1 to 110-8, in accordance with some embodiments. Assume that a packet containing a write request (1) is transmitted from I/O circuit 118-1 over the routing network 102-1 to the management processor 116-1. The management processor 116-1 determines to send the packet (2) over the network 102-1 to the packet processing circuit 118-1, which is configured to impart a service. After imparting the service to the write data packet, the processing circuit 118-1 sends the packet (3) over the routing network 102-1 to the management processor 116-1. Next, the management processor determines to send the packet (4) over the network 102-1 to the RAID controller 114-1 to request the write. The RAID controller 114-1 manages writing of the data (5) to one or more Flash circuits 110-1 to 110-8.

Figure 11:
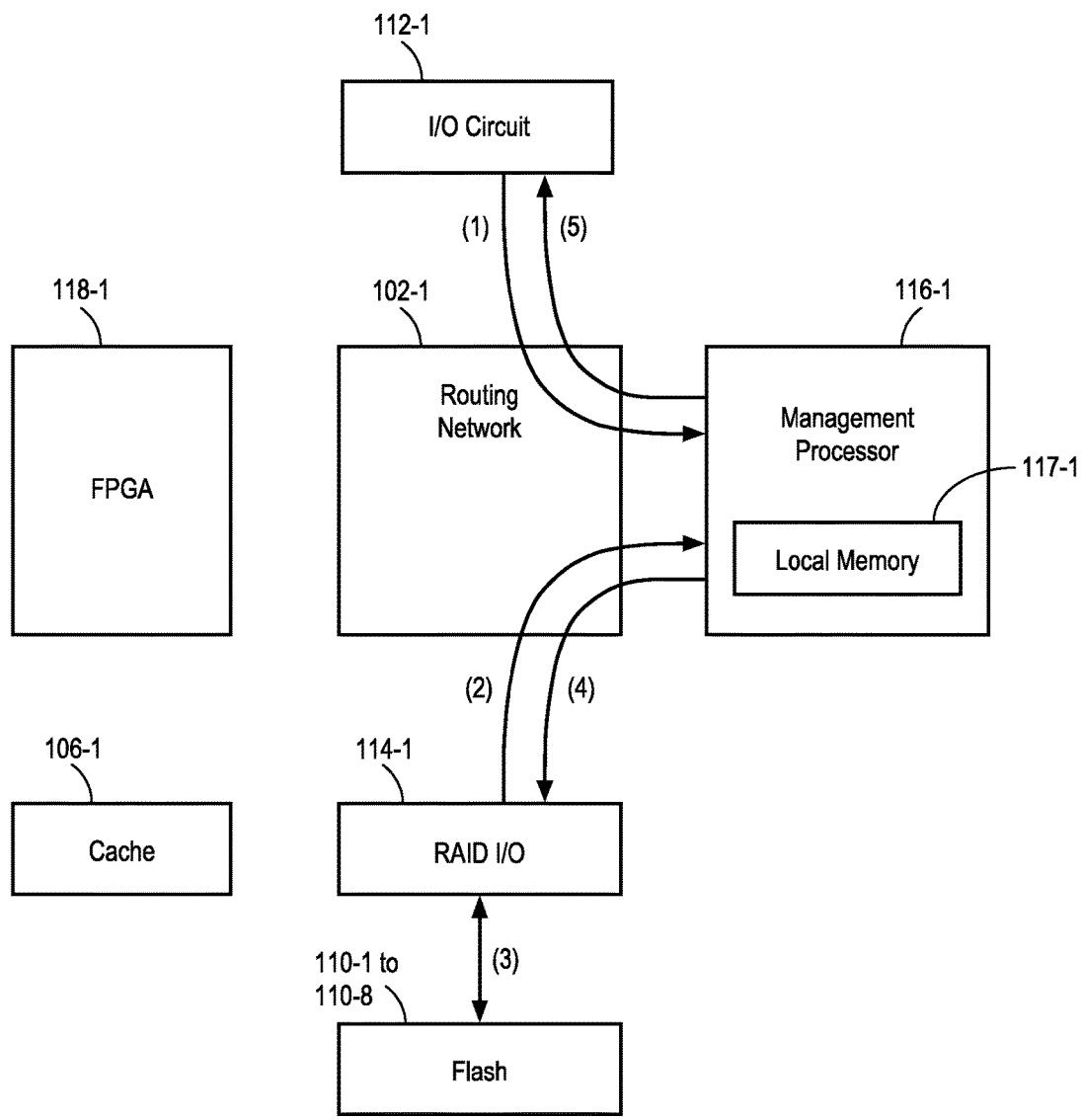
FIG. 11 is an illustrative drawing showing a third example routing of a data packet over the packet network under control of management processor so that a service is imparted to the packet as it proceeds between an I/O circuit and Flash storage, one or more of in accordance with some embodiments.

FIG. 11 is an illustrative drawing showing a second example routing of a data packet over the packet network 102-1 under control of management processor 116-1 so that a service is imparted to the packet as it proceeds between an I/O circuit 112-1 and Flash storage, one or more of 110-1 to 110-8, in accordance with some embodiments. Assume that a packet containing a read request (1) is transmitted from I/O circuit 118-1 over the routing network 102-1 to the management processor 116-1. The management processor 116-1 determines to send the request (2) over the network 102-1 to the RAID controller 114-1. The RAID controller 114-1 manages reading of the data (3) from one or more Flash circuits 110-1 to 110-8. After obtaining the data, the RAID controller 114-1 sends the read data in one or more packets (4) over the routing network 102-1 to the management processor 116-1. Next, the management processor determines to send read data to the I/O circuit 118-1 for delivery to a requester of the data (not shown).

Figure 12:
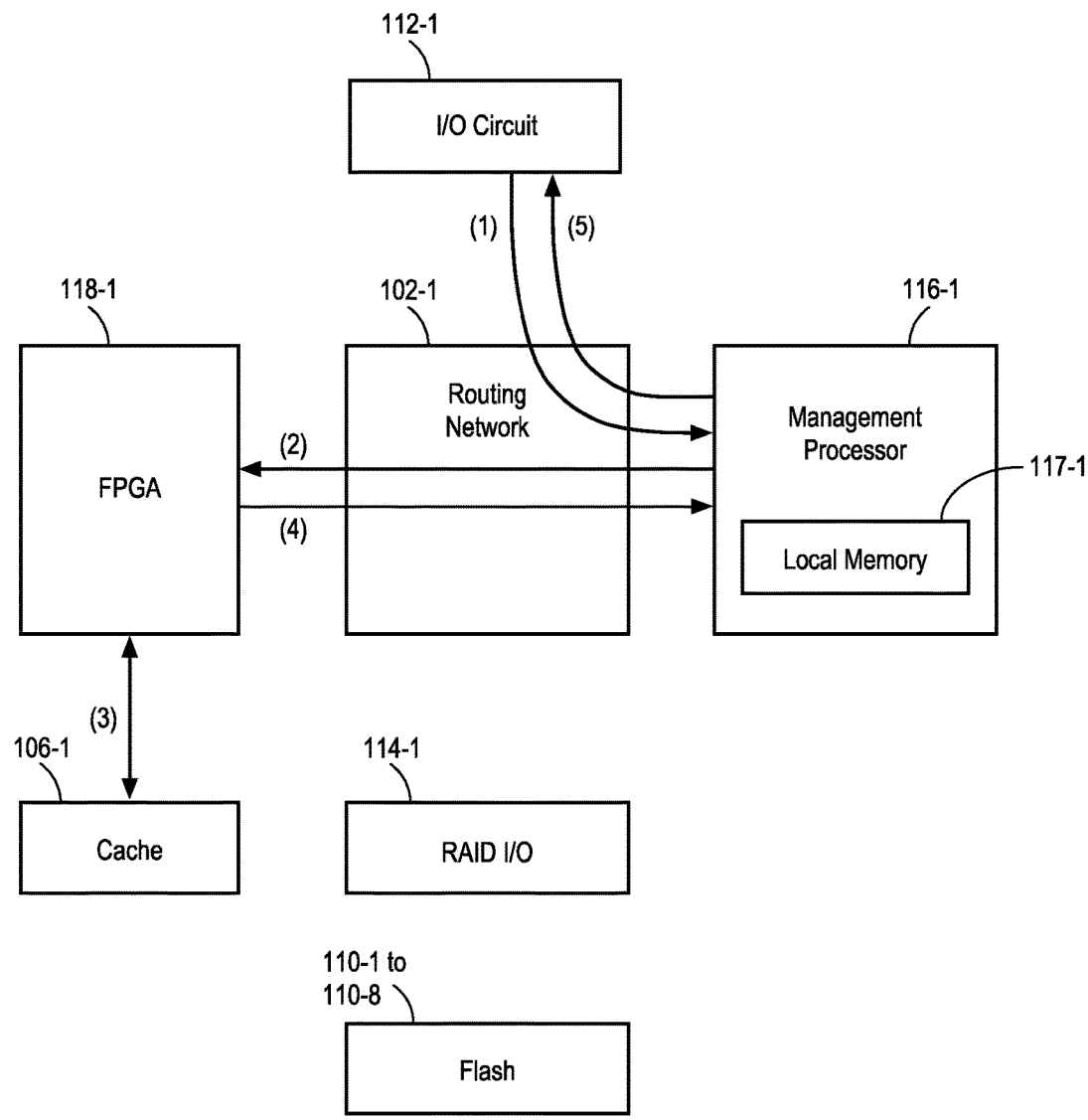
FIG. 12 is an illustrative drawing showing a fourth example involving a cache hit, involving routing of a data packet over the packet network under control of management processor so that a service is imparted to the packet as it proceeds between an I/O circuit and Flash storage, one or more of in accordance with some embodiments.

FIG. 12 is an illustrative drawing showing a fourth example routing of a data packet over the packet network 102-1 under control of management processor 116-1 so that a cache service is imparted to the packet as it proceeds between an I/O circuit 112-1 and Flash storage, one or more of 110-1 to 110-8, in accordance with some embodiments. More specifically, FIG. 12 is an illustrative drawing representing example between components of the system 100 involving a cache hit in accordance with some embodiments. Assume, for example, that a packet containing a read request (1) is transmitted from I/O circuit 118-1 over the routing network 102-1 to the management processor 116-1. The management processor 116-1 determines to send the packet (2) to the packet processing circuit 118-1 to request read of the read data (3) from cache 106-1. In response to determining that the requested read data currently is included in its cache 106-1, the processing circuit sends the data in one or more packets (4) over the routing network 102-1 to the management processor 116-1 to indicate that there has been a cache hit and to return the requested Read data. In response to receipt of the indication of a cache hit and the read data, the management processor 116-1 determines to transmit the read data in one or more packets (5) to the I/O circuit 118-1.

Figure 13:
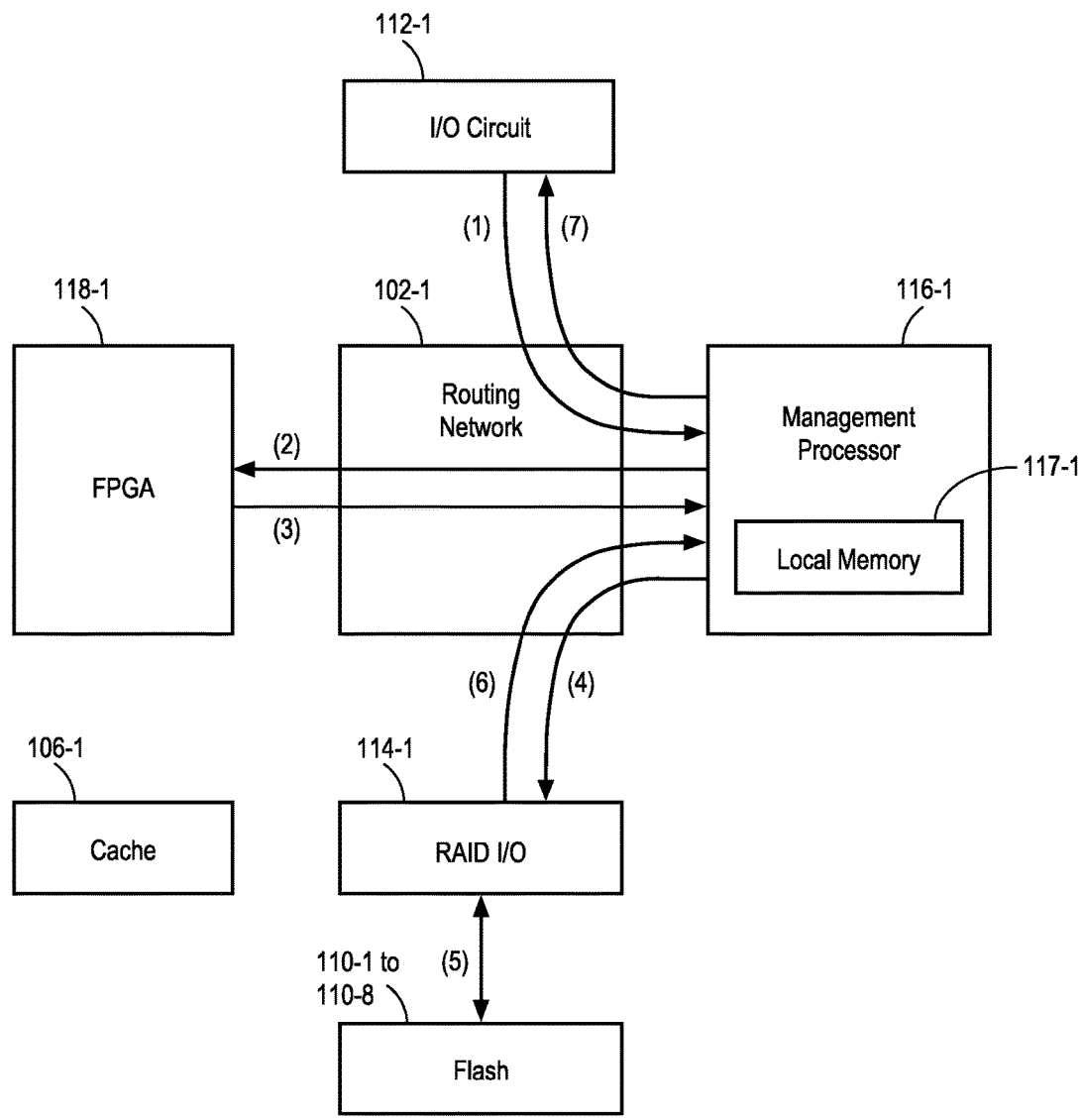
FIG. 13 is an illustrative drawing showing a fifth example involving a cache miss, involving routing of a data packet over the packet network under control of management processor so that a service is imparted to the packet as it proceeds between an I/O circuit and Flash storage, one or more of in accordance with some embodiments.

FIG. 13 is an illustrative drawing showing a fifth example routing of a data packet over the packet network 102-1 under control of management processor 116-1 so that a cache service is imparted to the packet as it proceeds between an I/O circuit 112-1 and Flash storage, one or more of 110-1 to 110-8, in accordance with some embodiments. More specifically, FIG. 13 is an illustrative drawing representing example between components of the system 100 involving a cache miss in accordance with some embodiments. Assume, for example, that a packet containing a read request (1) is transmitted from I/O circuit 118-1 over the routing network 102-1 to the management processor 116-1. The management processor 116-1 determines to send the read request packet (2) to the packet processing circuit 118-1 to request the read data from cache 106-1. In response to determining that the requested read data currently is not included in its cache 106-1, the processing circuit 118-1 sends a packet (3) over the routing network 102-1 to the management processor 116-1 to indicate that there has been a cache miss. Next, the management processor 116-1 determines to send the read request packet (4) to the RAID controller 114-1 to manage retrieval of the requested data (5) from one or more of the Flash storage circuits 110-1 to 110-8. In response to receiving the read data, the RAID controller 114-1 sends one or more packets (6) containing the read data to the management processor. In response to receipt of the read data, the management processor 116-1 determines to transmit the one or more read data-containing packets (7) to the I/O circuit 118-1.

Figure 14:
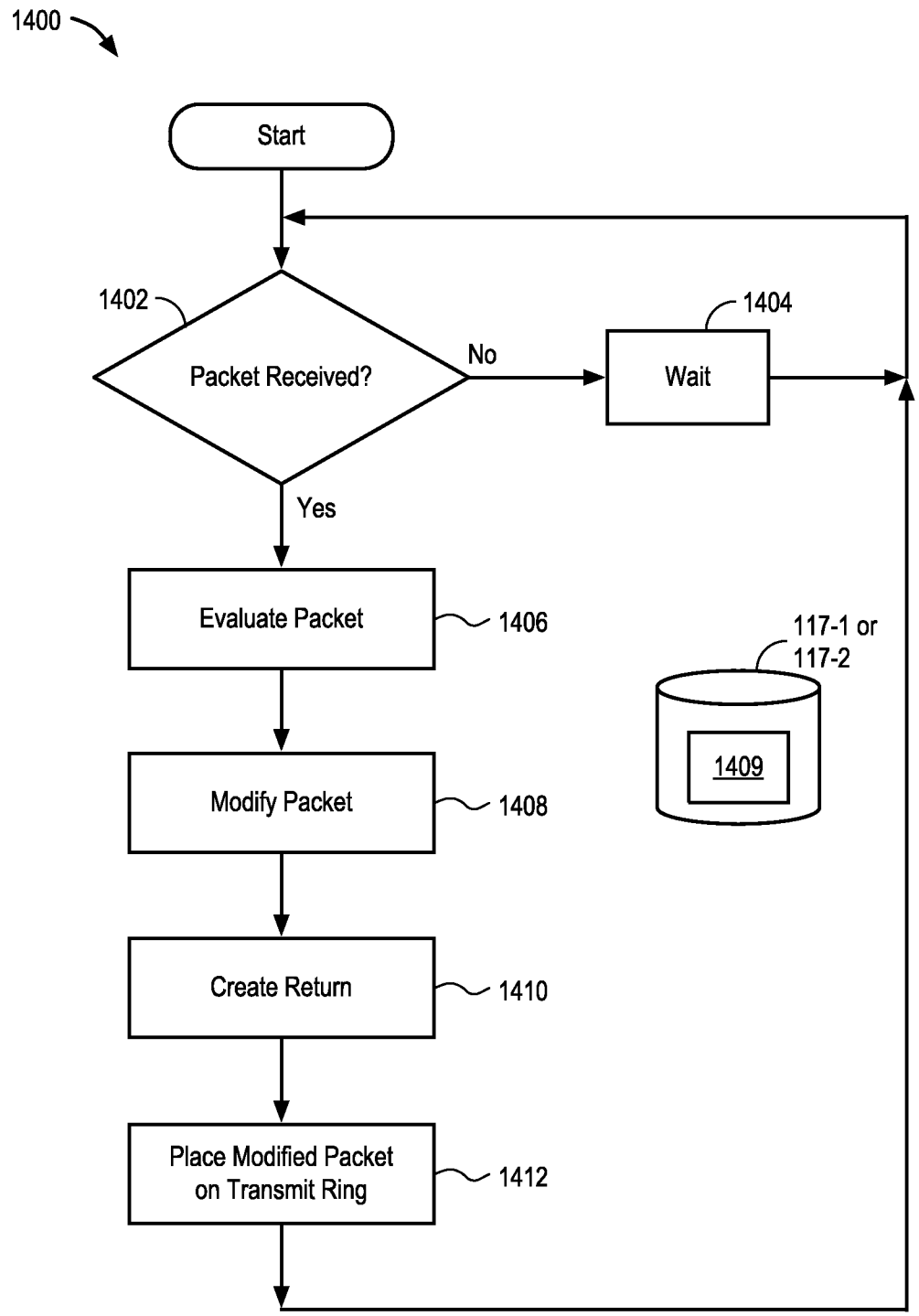
FIG. 14 is an illustrative flow diagram representing a portion of a first routing management process performed using a management processor in accordance with some embodiments.
Figure 15:
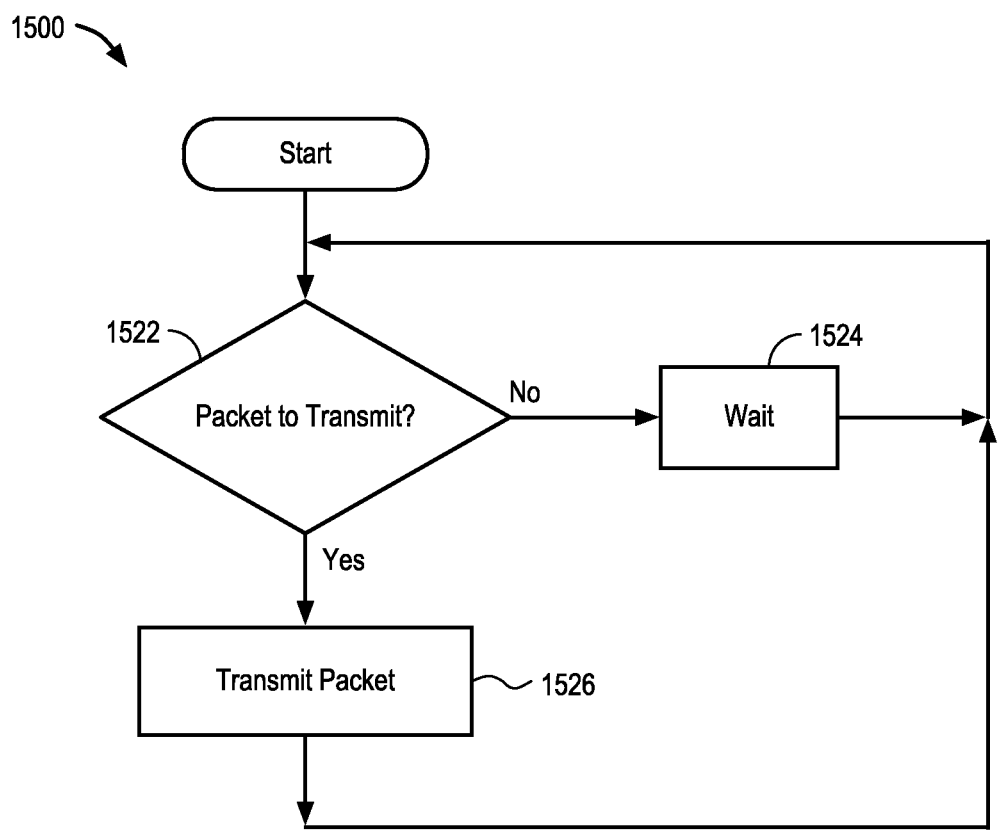
FIG. 15 is an illustrative flow diagram representing a portion of a second routing management process performed using a management processor in accordance with some embodiments.

FIGS. 14-15 are illustrative flow diagrams representing first and second routing management processes performed using management processors 116-1, 116-2 in accordance with some embodiments. The management processors 116-1, 116-2 are configured to implement a separate instance of these processes for each pair of receive/transmit buffers shown in FIG. 8 that is instantiated within local memory 117-1, 117-2. In some embodiments, these processes are implemented as software drivers that manage input and output of packets received and transmitted over the networks 102-1, 102-2.

FIG. 14 is an illustrative flow diagram representing a portion of a first routing management process 1400 performed using a management processor in accordance with some embodiments. In some embodiments, management processors 116-1, 116-2 are configured to implement the first routing management process 1400 for each pair of ring buffers represented in FIG. 8. Decision module 1402 monitors a receive ring buffer, e.g. as represented by receive ring buffer 514 in FIG. 7, to determines whether it contains a received packet. In response to a determination that no received packet is contained in the monitored receive buffer, decision module 1302 checks again after some delay 1404. The delay may be implemented using periodic polling or may be interrupt driven, for example. In response to determining that a received packet is contained within the monitored receive ring buffer, module 1406 evaluates a packet contained in a tail index buffer element of the receive ring buffer to determine whether a service is to be imparted to the packet. In some embodiments, such determination depends at least in part upon a Flash storage location indicated within a header portion of the received packet, for example. In some embodiments, packet that indicate a prescribed Flash storage location (to which to wrote data or from which to read data for example) may be subject to a particular service while packets directed to a different Flash storage location may not be subject to the same service or may be subjected to no service at all. In some embodiments, In some embodiments, such determination also may depend upon what command is associated with the received packet. For example, a packet associated with a read command may be routed differently from a packet associated with a write command, for example. In some embodiments, packet directed to a read from or a write to data some prescribed Flash storage location may be subject to a particular service while packets directed to a different Flash storage location may not be subject to the same service or may be subjected to no service at all. Module 1408 modifies an endpoint address within the received packet based upon the determination.

For example, as illustrated in the routing examples of FIGS. 9-13, packets may be routed to a packet processing circuit 118-1 or not depending upon a determination of whether a service is to be provided. Module 1408 creates a return record 1409 in local memory 117-1 (or 117-2) to indicate a next endpoint destination for the packet or a responsive packet. For example, referring to FIG. 9, return information for a read request packet received by the management processor 116-1 from the I/O circuit 112-1 that is transmitted by the management processor 116-1 to the RAID I/O 114-1 may include an indication of a next hop address indicating the packet processing circuit 118-1. Alternatively, referring to FIG. 10 for example, return information for a write request packet received by the management processor 116-1 from the I/O circuit 112-1 that is transmitted by the management processor 116-1 to the packet processing circuit 118-1 may include a next hop address indicating the RAID I/O 114-1. Module 1410 places the modified packet onto a corresponding transmit ring buffer, e.g. as represented by transport ring buffer 520 in FIG. 7.

FIG. 15 is an illustrative flow diagram representing a portion of a second routing management process 1520 performed using a management processor in accordance with some embodiments. In some embodiments, management processors 116-1, 116-2 are configured to implement the first routing management process. Decision module 1522 monitors a transmit ring buffer to determines whether it contains a packet to be transmitted. In response to a determination that no received packet is contained in the monitored receive buffer, decision module 1522 checks again after some delay 1524. In response to determining that a packet to be transmitted is contained within the monitored transmitting buffer, module 1526 causes a packet in a tail index buffer element to be transmitted over the network 102-1.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The invention claimed is:

1. A system comprising:
a packet routing network;
Flash storage circuitry;
a processor configured to act as a root complex for the network;
an input/output (I/O) circuit coupled as an endpoint to the network and configured to send and receive packets to and from the processor over the network;
a packet processing circuit coupled as an endpoint to the network and configured to receive a packet from the processor over the packet routing network, to impart a service to the packet, and to send the packet with the imparted service to the processor over the packet routing network; and a RAID management circuit coupled as an endpoint to the network and configured to send and receive packets to and from the processor over the network and configured to send and receive packets to and from the Flash storage circuitry;

wherein the processor is configured to determine routing of packets among the I/O circuit, packet processing circuit and RAID management circuit;

wherein the processor is configured to receive a packet over the packet routing network as the packet proceeds over the packet routing network from the I/O circuit to the RAID management circuit, to route the received packet to the packet processing circuit for imparting of a service thereto, to receive the packet with the imparted service over the packet routing network from the packet processing circuit, and to route the packet with the imparted service to the RAID management circuit; and wherein the processor is configured to receive a packet over the packet routing network as the packet proceeds over the packet routing network from the RAID management circuit to the I/O circuit, to route the received packet to the packet processing circuit for imparting of a service thereto, to receive the packet with the imparted service over the packet routing network from the packet processing circuit, and to route the packet with the imparted service to the I/O circuit.

2. The system of claim 1 further including:
a switch fabric coupled between the RAID management circuit and the Flash storage circuitry.

3. The system of claim 1 further including:
a local memory device associated with the processor that includes,
first buffer data structure to manage flow of packets between the processor and the I/O circuit,
second buffer circuitry to manage flow of packets between the processor and the packet processing circuit, and
third buffer circuitry to manage flow of packets between the processor and the RAID management circuit.

4. The system of claim 1, wherein the packet processing circuit includes a reconfigurable circuit.

5. The system of claim 1, wherein the packet processing circuit includes a field programmable gate array device (FPGA).

6. The system of claim 1, wherein the service includes encryption or decryption.

7. The system of claim 1, wherein the service includes compression or decompression.

8. The system of claim 1, wherein the service includes duplication or de-duplication.

9. The system of claim 1, wherein the service includes replication.

10. The system of claim 1, wherein the service includes a snapshot.

* * * * *